(12) United States Patent
Amao et al.

(10) Patent No.: US 8,905,534 B2
(45) Date of Patent: Dec. 9, 2014

(54) INK COMPOSITION AND IMAGE FORMING METHOD

(71) Applicant: FUJIFILM Corporation, Minato-ku, Tokyo (JP)

(72) Inventors: Akihito Amao, Ashigarakami-gun (JP); Hirotaka Kitagawa, Ashigarakami-gun (JP); Koji Yasuda, Ashigarakami-gun (JP); Toshihiro Kamada, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/146,863

(22) Filed: Jan. 3, 2014

(65) Prior Publication Data

US 2014/0132685 A1    May 15, 2014

Related U.S. Application Data

(63) Continuation of application No. PCT/JP2012/066338, filed on Jun. 27, 2012.

(30) Foreign Application Priority Data

Jul. 8, 2011    (JP) .................................. 2011-152280

(51) Int. Cl.
| | |
|---|---|
| B41J 2/01 | (2006.01) |
| C09D 11/00 | (2014.01) |
| C09D 11/30 | (2014.01) |
| B41J 2/21 | (2006.01) |
| B41J 11/00 | (2006.01) |

(52) U.S. Cl.
CPC ................ *C09D 11/30* (2013.01); *C09D 11/00* (2013.01); *B41J 11/0015* (2013.01); *B41J 2/2107* (2013.01)
USPC .............................. 347/100; 347/95; 523/160

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ............. 347/100, 95, 96, 101, 102, 22, 9, 99, 347/88, 105, 20; 106/31.6, 31.13, 31.27; 523/160, 161
See application file for complete search history.

(56) References Cited

U.S. PATENT DOCUMENTS

| | | | |
|---|---|---|---|
| 8,471,065 B2 | 6/2013 | Burton et al. | |
| 8,590,999 B2 | 11/2013 | Irita et al. | |
| 2002/0065335 A1 | 5/2002 | Noguchi et al. | |
| 2005/0288384 A1 | 12/2005 | Kanke et al. | |
| 2011/0205291 A1* | 8/2011 | Yasuda et al. | 347/21 |
| 2013/0222501 A1* | 8/2013 | Kamada | 347/102 |
| 2013/0222502 A1* | 8/2013 | Kobayashi | 347/102 |
| 2013/0229291 A1* | 9/2013 | Kaeriyama et al. | 341/21 |
| 2014/0100390 A1 | 4/2014 | Amao et al. | |

FOREIGN PATENT DOCUMENTS

| | | |
|---|---|---|
| CN | 101675084 A | 3/2010 |
| CN | 102167933 A | 8/2011 |
| CN | 103459366 A | 12/2013 |
| JP | 1-163166 A | 6/1989 |
| JP | 5-75740 B2 | 10/1993 |
| JP | 2002-187918 A | 7/2002 |
| JP | 2004-323753 A | 11/2004 |
| JP | 2005-307198 A | 11/2005 |
| JP | 2007-31372 A | 2/2007 |
| WO | 2012133182 A1 | 10/2012 |

OTHER PUBLICATIONS

International Search Report for PCT/JP2012/066388 dated Aug. 7, 2012.
Written Opinion for PCT/JP2012/066388 dated Aug. 7, 2012.
Notice of First Office Action, dated Jun. 9, 2014, issued in corresponding CN Application No. 201280033455.2, 16 pages in English and Chinese.

\* cited by examiner

*Primary Examiner* — Manish S Shah
(74) *Attorney, Agent, or Firm* — Sughrue Mion, PLLC

(57) ABSTRACT

An ink composition having excellent storage stability and curing properties after an image formation and an image forming method using the ink composition are provided.

An ink composition including (A) a polymerizable compound represented by the following general formula (1) and (B) a polymerization initiator and an image forming method using the ink composition.

General formula (1)

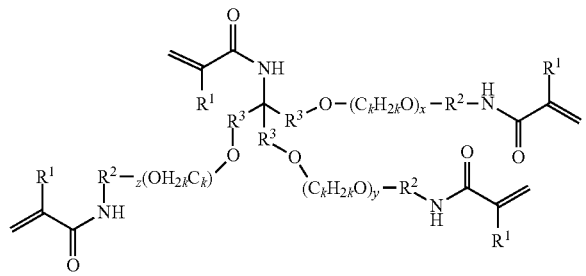

In the general formula (1), $R^1$ represents a hydrogen atom or a methyl group. $R^2$ represents a liner or branched alkylene group having 2 to 4 carbon atoms. However, in $R^2$, it is not possible to have a structure in which an oxygen atom and a nitrogen atom which are bonded to both ends of $R^2$ are bonded to the same carbon atom of $R^2$. $R^3$ represents a divalent linking group. k represents 2 or 3. x, y and z each independently represent an integer of 0 to 6 and x+y+z satisfies 0 to 18.

19 Claims, 2 Drawing Sheets

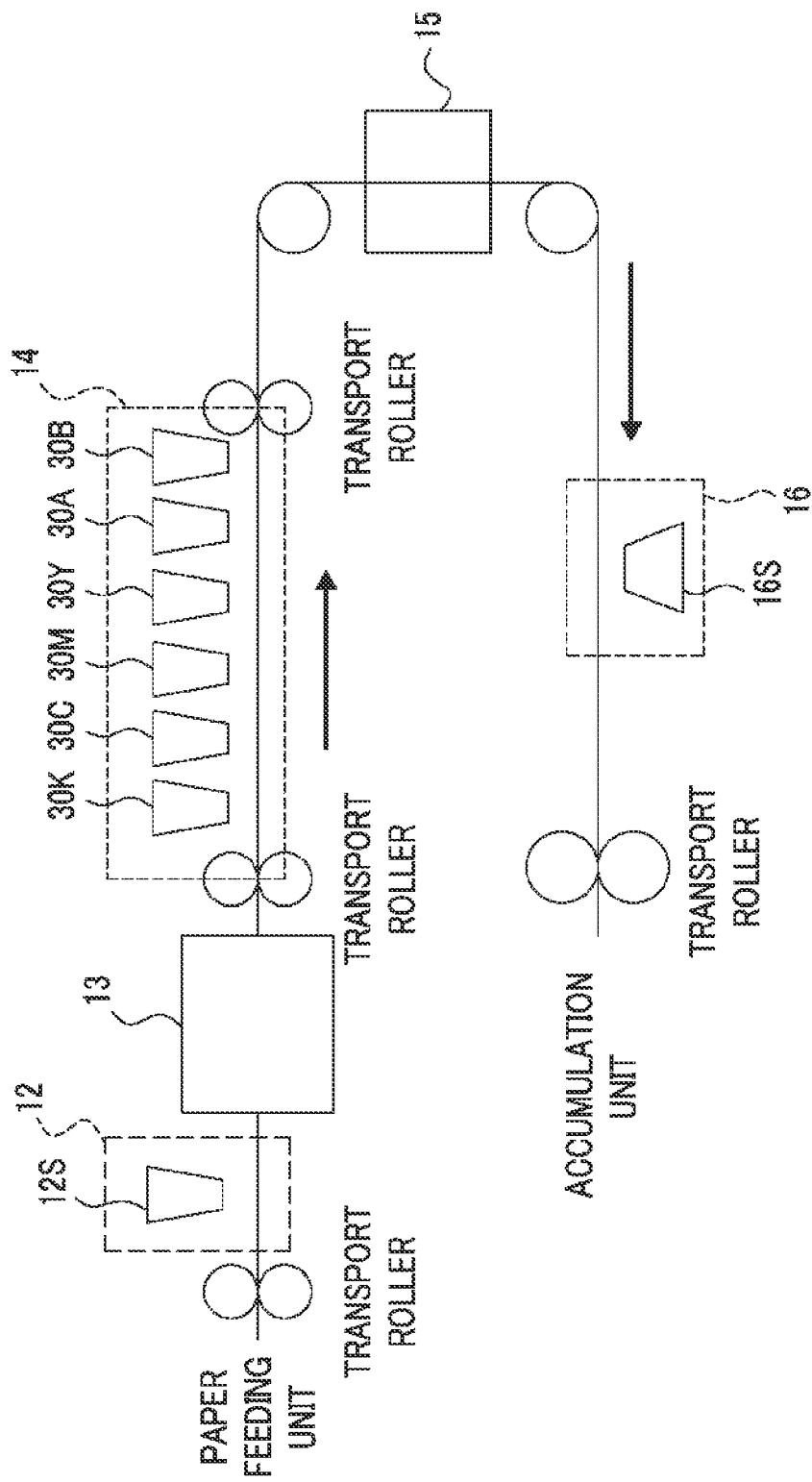

INK COMPOSITION AND IMAGE FORMING METHOD

BACKGROUND OF THE INVENTION

1. Field of the Invention

The present invention relates to an ink composition and an image forming method using the same.

2. Description of the Related Art

As one of causes of air and environmental pollution, a volatile organic compound (VOC) has been recently viewed as a problem. VOC has been widely used industrially, as various kinds of solvents and fuels, and the suppression of the amount of emission thereof and the antiscattering measure have been demanded. From such a background, also in an ink for printing, an aqueous ink which uses a hydrophilic substance such as water and alcohol as a medium is gathering attention.

As a method of fixing an image which is formed by using an aqueous ink, for example, a method of fixing by making an aqueous ink include a thermoplastic latex and heating the formed image, a method of curing and fixing an image by forming an image by an active energy ray-curable type aqueous ink including a polymerizable compound and a polymerization initiator and irradiating with an active energy ray such as an ultraviolet ray, and the like are known. In the latter of an active energy ray-curable type ink, an improvement of curing properties is a problem and an improvement of a polymerizable compound and a polymerization initiator which are combined has been conducted.

Such an active energy ray-curable type aqueous ink is also applied to an ink jet recording method. In an ink jet recording method, an image is formed by ejecting an ink from a nozzle tip as a fine droplet and adhering onto a medium to be recorded. For an ink which is used, characteristics such as being able to fix as a film by curing an image (curing properties) and not generating the changes in the physical properties, a sediment, or the like when storing (the storage stability) are required. For example, an active energy ray-curable type aqueous ink using a polyfunctional (meth)acrylamide compound as a water-soluble polymerizable substance is described in JP2005-307198A.

SUMMARY OF THE INVENTION

When the present inventors retested an ink composition described in JP2005-307198A, it was found that the polyfunctional acrylamide compound which was used in the ink composition was hydrolyzed to generate (meth)acrylamide in a test for the storage stability. (Meth)acrylamide is a substance which is required to be reduced, from the viewpoint of safety to living beings. In addition, the ink composition described in JP2005-307198A described above was far from satisfactory yet, as to also curing properties after irradiating with an active energy ray.

The present invention provides an ink composition which can give both excellent storage stability and curing properties and an image forming method using the ink composition.

Therefore, the present inventors took the above problem into consideration and conducted various examinations of a water-soluble polymerizable compound which was suitable to the ink composition. As a result, in the ink composition using the polyfunctional polymerizable compound having a structure represented by the following general formula (1), it was found that the storage stability was improved as well as an ink film (image) formed by the ink composition exhibited excellent curing properties. The present invention has been completed based on the findings above.

That is, the above problem of the present invention was solved by the following means.

An ink composition of the present invention includes (A) a polymerizable compound represented by the following general formula (1) and (B) a polymerization initiator.

[Chem. 1]

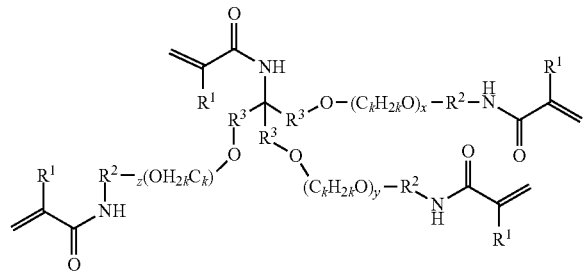

General formula (1)

In the general formula (1), $R^1$ represents a hydrogen atom or a methyl group. $R^2$ represents a liner or branched alkylene group having 2 to 4 carbon atoms. However, in $R^2$, it is not possible to have a structure in which an oxygen atom and a nitrogen atom which are bonded to both ends of $R^2$ are bonded to the same carbon atom of $R^2$. $R^3$ represents a divalent linking group. k represents 2 or 3. x, y and z each independently represent an integer of 0 to 6 and x+y+z satisfies 0 to 18.

The ink composition preferably includes (C) a monofunctional polymerizable compound.

In addition, (C) the monofunctional polymerizable compound is preferably a monofunctional polymerizable compound having a (meth)acrylamide structure.

In addition, (C) the monofunctional polymerizable compound is preferably a compound represented by the following general formula (2).

[Chem. 2]

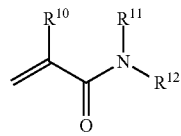

General formula (2)

In the general formula (2), $R^{10}$ represents a hydrogen atom or a methyl group, $R^{11}$ represents a hydrogen atom, a methyl group or an ethyl group, and $R^{12}$ represents a substituted or unsubstituted alkyl group $R^{11}$ and $R^{12}$ may be bonded to each other to form a five to eight-membered ring and the five to eight-membered ring may further include at least one kind selected from —O—, —S— and —$NR^b$—. $R^b$ represents a hydrogen atom or an alkyl group having 1 to 4 carbon atoms.

In addition, preferably, the ratio of contents of (A) the polymerizable compound and (C) the monofunctional polymerizable compound in the ink composition is (A):(C)=1:99 to 90:10 in mass basis.

In addition, preferably, the content of (A) the polymerizable compound to the total amount of the ink composition is from 0.1% by mass to 20% by mass.

In addition, preferably, the content of (C) the monofunctional polymerizable compound to the total amount of the ink composition is from 2% by mass to 35% by mass.

In addition, preferably, the ink composition preferably includes (D) a coloring material.

In addition, preferably, the ink composition preferably includes (E) a solvent.

In addition, preferably, (E) the solvent includes water.

In addition, preferably, the ink composition is for ink jet recording.

An image forming method of the present invention includes applying the ink composition of the present invention onto a recording medium and irradiating the applied ink composition with an active energy ray.

Applying the ink composition onto the recording medium is preferably performed by an ink jet method.

In the present invention, "(meth)acrylamide", "(meth)acrylate" and "(meth)acryl" respectively represent acrylamide and/or methacrylamide, acrylate and/or methacrylate and "acryl" and/or "methacryl". In addition, in the present invention, "to" is used as the meaning which includes the numerical values which are written before and after thereof as the lower limit value and the upper limit value.

The ink composition of the present invention has excellent storage stability and is immediately cured by irradiating with an active energy ray, or the like during printing. According to the image forming method of the present invention using the ink composition, an image formed by irradiating with an active energy ray, or the like is fixed by immediately curing.

BRIEF DESCRIPTION OF THE DRAWINGS

FIG. 2 is a schematic diagram showing a step of forming image in Example.

DESCRIPTION OF THE PREFERRED EMBODIMENTS

Figure 1:
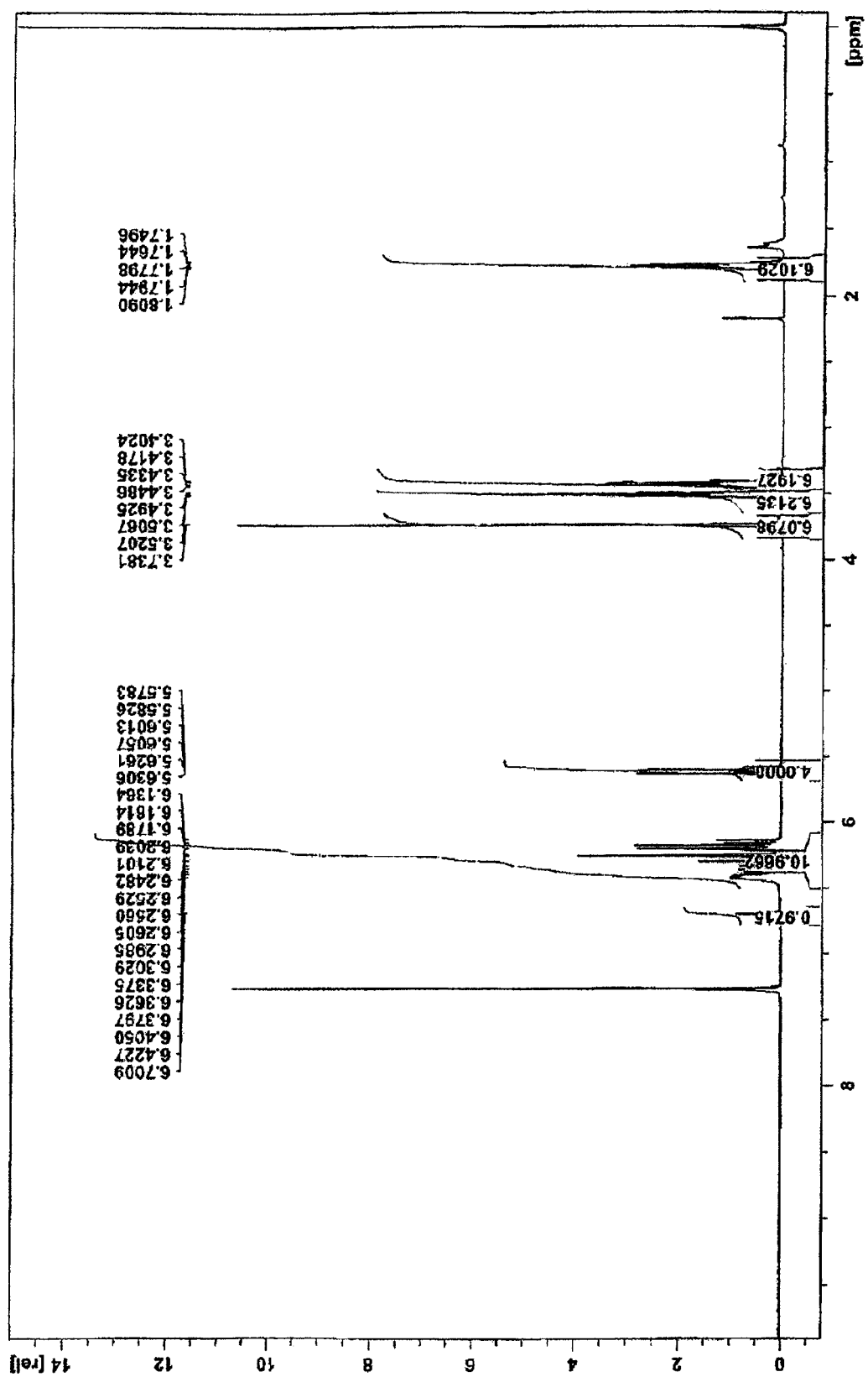
FIG. 1 is a diagram showing a $^1$H-NMR spectrum of a polymerizable compound 1 synthesized in Example.

The ink composition of the present invention includes (A) a polymerizable compound represented by the general formula (1) and (B) a polymerization initiator as an essential component and (C) a monofunctional polymerizable compound, (D) a coloring material and (E) a solvent are further included, as necessary.

Firstly, description will be given of each component of the ink composition of the present invention.

[Component]

(A) Polymerizable Compound Represented by the General Formula (1)

The ink composition of the present invention includes a compound represented by the following general formula (1). The compound has four acrylamide groups or methacrylamide groups as a polymerizable group in a molecule and has high polymerizing ability and curing ability. The compound, for example, is polymerized and shows curing properties by applying an active energy ray such as an α ray, a γ ray, an X ray, an ultraviolet ray, visible light, infrared light or an electron beam, or energy such as heat. In addition, the compound represented by the general formula (1) shows water-soluble and is favorably dissolved in a water-soluble organic solvent such as water, alcohol or the like.

[Chem. 3]

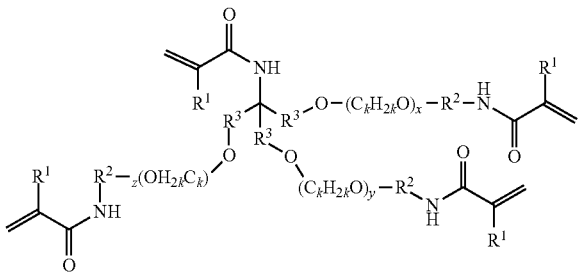

General formula (1)

In the general formula (1), $R^1$ represents a hydrogen atom or a methyl group. A plurality of $R^1$'s may be the same as or different from each other. $R^1$ is preferably a hydrogen atom.

In the general formula (1), $R^2$ represents a liner or branched alkylene group having 2 to 4 carbon atoms. A plurality of $R^2$'s may be the same as or different from each other. $R^2$ is preferably an alkylene group having 3 to 4 carbon atoms, more preferably an alkylene group having 3 carbon atoms, and particularly preferably a liner alkylene group having 3 carbon atoms. An alkylene group of $R^2$ may further have a substituent, and as the substituent, an aryl group, an alkoxy group, and the like are included.

However, in $R^2$, it is not possible to have a structure in which an oxygen atom and a nitrogen atom which are bonded to both ends of $R^2$ are bonded to the same carbon atom of $R^2$. $R^2$ is a liner or branched alkylene group which is linked to a oxygen atom with a nitrogen atom of a (meth)acrylamide group, and in a case where the alkylene group is a branched structure, it is also considered that it is possible to have an —O—C—N— structure (a hemiaminal structure) in which an oxygen atom and a nitrogen atom of the (meth)acrylamide group of both ends of the alkylene group are bonded to the same carbon atom in a alkylene group. However, the compound used in the present invention and represented by the general formula (1) does not include a compound having an —O—C—N— structure. According to what the present inventors examined, it was found that if having an —O—C—N— structure in a molecule, decomposition is likely to occur at the position of the carbon atom. The compound having an —O—C—N— structure is likely to decompose during storing and thus makes the storage stability of the ink composition decrease. Therefore, in the present invention, the compound is that in which an —O—C—N— structure is not used.

In the general formula (1), $R^3$ represents a divalent linking group. As a divalent linking group of $R^3$, an alkylene group, an arylene group, a heterocyclic group, a group consisting of combinations thereof, and the like are included and an alkylene group is preferable. Moreover, in a case where a divalent linking group includes an alkylene group, at least one kind of group selected from —O—, —S— and —NR$^a$— may be further included in the alkylene group. R$^a$ represents a hydrogen atom or an alkyl group having 1 to 4 carbon atoms.

In a case where $R^3$ includes an alkylene group, as an example of the alkylene group, a methylene group, an ethylene group, a propylene group, a butylene group, a pentylene group, a hexylene group, a heptylene group, an octylene group, a nonylene group, and the like are included. The number of carbon atoms of an alkylene group of $R^3$ is preferably 1 to 6, further preferably 1 to 3, and particularly preferably 1.

In the alkylene group of $R^3$, at least one kind selected from —O—, —S—, and —NR$^a$— may be further included, and as an example of the alkylene group including —O—, —C$_2$H$_4$—O—C$_2$H$_4$—, —C$_3$H$_6$—O—C$_3$H$_6$—, and the like are included.

The alkylene group of $R^3$ may further have a substituent and as an example of the substituent, an aryl group, an alkoxy group and the like are included.

In a case where $R^3$ includes an arylene group, as an example of the arylene group, a phenylene group, a naphthylene group, and the like are included. The number of carbon atoms of an arylene group of $R^3$ is preferably 6 to 14, further preferably 6 to 10, and particularly preferably 6.

The arylene group of $R^3$ may further have a substituent and as an example of the substituent, an alkyl group, an alkoxy group, and the like are included.

In a case where $R^3$ includes a heterocyclic group, as a heterocyclic group, a heterocyclic group which is a five-membered ring or a six-membered ring is preferable, and they may be further condensed. In addition, a heterocyclic group may be an aromatic heterocyclic or a non-aromatic heterocyclic. As a heterocyclic group in a case where $R^3$ includes a heterocyclic group, specifically, pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazolin, and the like are included. Among those, an aromatic heterocyclic group is preferable, and pyridine, pyrazine, pyrimidine, pyridazine, triazine, pyrazole, imidazole, benzimidazole, triazole, triazole, benzothiazole, isothiazole, benzisothiazole, thiadiazole are preferable. Moreover, the heterocyclic group described above is exemplified with the form which abbreviates the position of substitution, however, the position of substitution is not limited, for example, if the heterocyclic group is pyridine, pyridine is capable of being substituted at the 2-position, the 3-position and the 4-position, and all substitution products thereof can be included. The heterocyclic group described above may further have a substituent, and as the substituent, an alkyl group, an aryl group, an alkoxy group, and the like are included.

In the general formula (1), k represents 2 or 3. A plurality of k's may be the same as or different from each other. In addition, $C_KH_{2K}$ may be a liner structure or a branched structure.

In the general formula (1), x, y and z each independently represent an integer of 0 to 6, are preferably an integer of 0 to 5, and are more preferably an integer of 0 to 3. x+y+z satisfies 0 to 18, are preferably 0 to 15, and are more preferably 0 to 9.

Specific examples of the polymerizable compound represented by the general formula (1) are shown below, however, the present invention is not limited thereto.

[Chem. 4]

Polymerizable compound 1

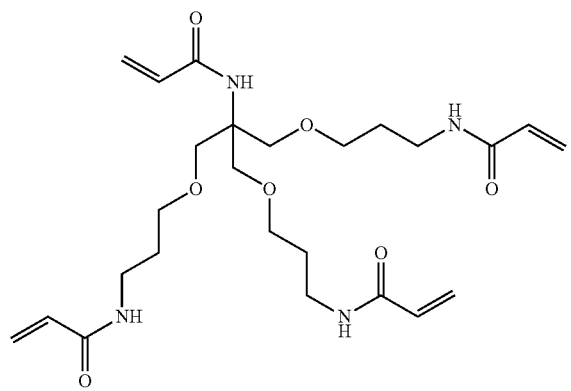

Polymerizable compound 2

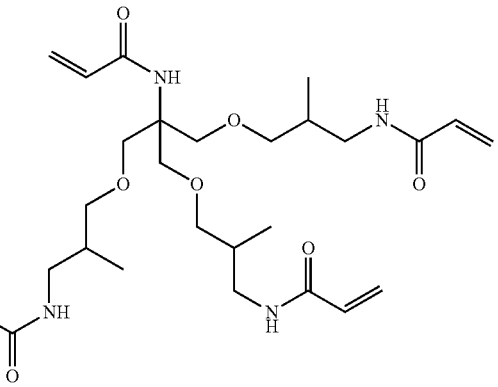

Polymerizable compound 3

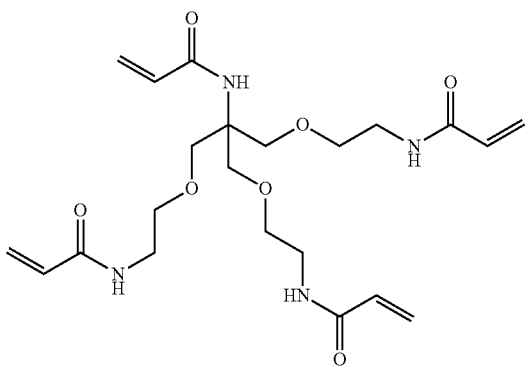

Polymerizable compound 4

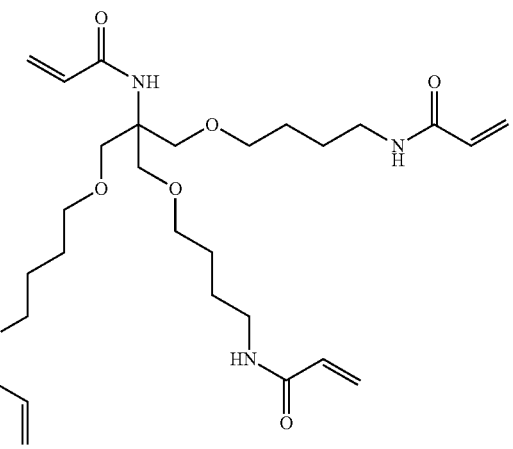

Polymerizable compound 5

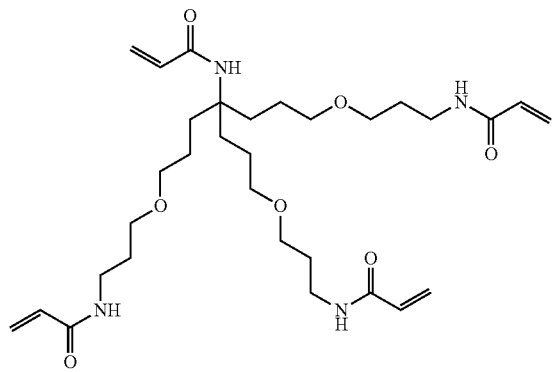

-continued

Polymerizable compound 6

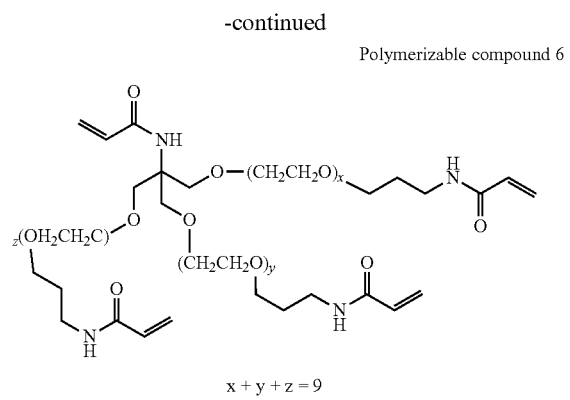

x + y + z = 9

The polymerizable compound represented by the general formula (1) described above, for example, can be prepared in accordance with the following scheme 1 or the scheme 2.

Scheme 1

[Chem. 5]

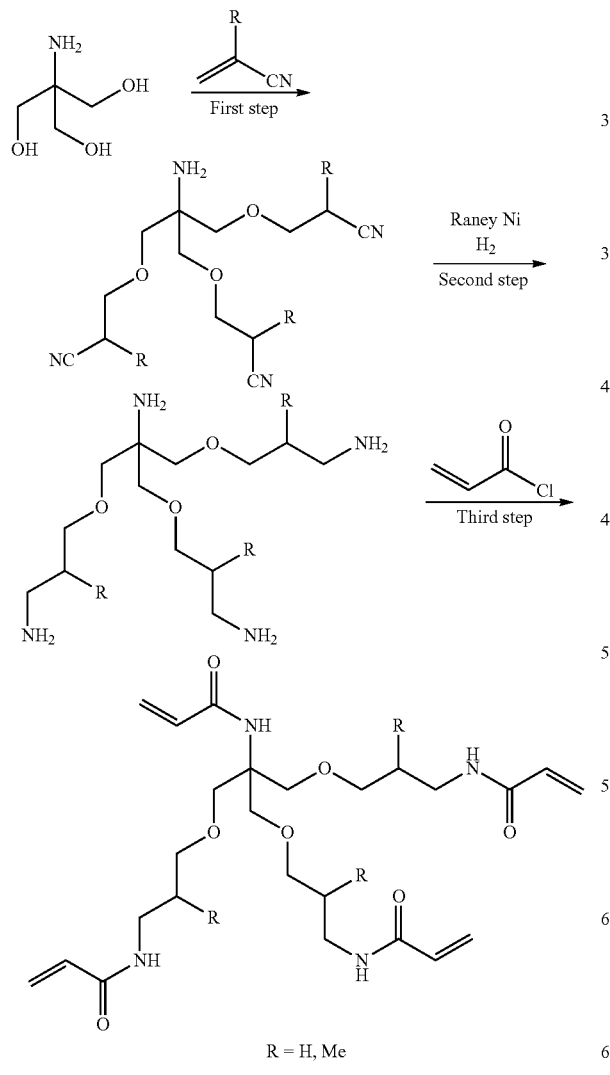

R = H, Me

Scheme 1

(First step) A step of obtaining a polycyano compound by the reaction of acrylonitrile and trishydroxymethylaminomethane. The reaction in the step is preferably performed at 3° C. to 60° C. for 2 hours to 8 hours.

(Second step) A step of obtaining a polyamine compound by a reduction reaction in which the polycyano compound is reacted with hydrogen in the presence of a catalyst. The reaction in the step is preferably performed at 20° C. to 60° C. for 5 hours to 16 hours.

(Third step) A step of obtaining a polyfunctional acrylamide compound by an acylation reaction of the polyamine compound and acrylic acid chloride or methacrylic acid chloride. The reaction in the step is preferably performed at 3° C. to 25° C. for 1 hour to 5 hours. Moreover, as an acylating agent, diacrylic anhydride or dimethacrylic anhydride may be used instead of acid chloride. Moreover, in an acylation step, by using both of acrylic acid chloride and methacrylic acid chloride, a compound having an acrylamide group and a methacrylamide group in the same molecule can be obtained as an end product.

Scheme 2

[Chem. 6]

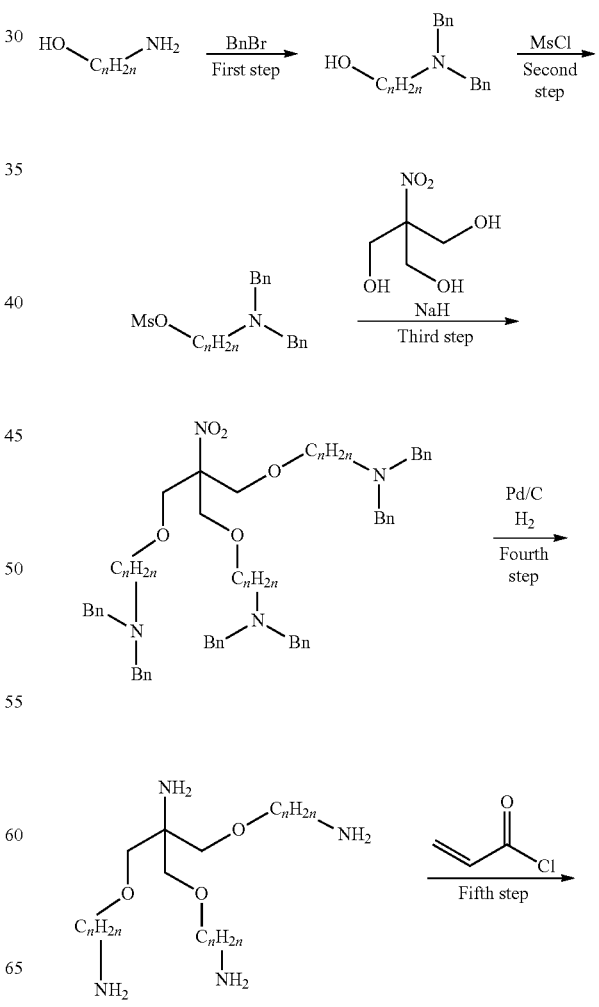

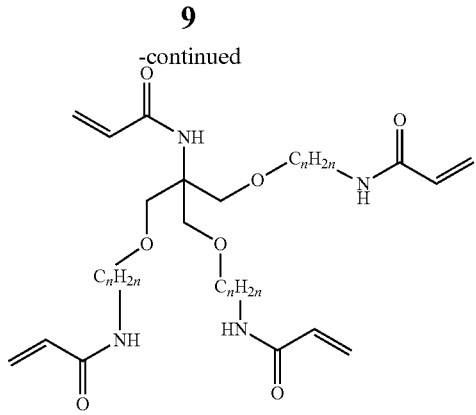

Scheme 2

(First step) A step of obtaining a nitrogen protected amino alcohol compound by introducing a protecting group such as a benzyl group, a benzyloxycarbonyl group, or the like to a nitrogen atom of an amino alcohol. The reaction in the step is preferably performed at 3° C. to 25° C. for 3 hours to 5 hours.

(Second step) A step of obtaining a sulfonyl compound by introducing a leaving group such as a methanesulfonyl group, p-toluenesulfonyl group, and the like to a OH group of the nitrogen protected amino alcohol compound. The reaction in the step is preferably performed at 3° C. to 25° C. for 2 hours to 5 hours.

(Third step) A step of obtaining an amino alcohol addition compound by the SN2 reaction of the sulfonyl compound and trishydroxymethylnitromethane. The reaction in the step is preferably performed at 3° C. to 70° C. for 5 hours to 10 hours.

(Fourth step) A step of obtaining a polyamine compound by a hydrogenation reaction in which the amino alcohol addition compound is reacted with hydrogen in the presence of a catalyst. The reaction in the step is preferably performed at 20° C. to 60 C for 5 hours to 16 hours.

(Fifth step) A step of obtaining, a polyfunctional acrylamide compound by an acylation reaction of the polyamine compound and acrylic acid chloride or methacrylic acid chloride. The reaction in the step is preferably performed at 3° C. to 25° C. for 1 hour to 5 hours. Moreover, as an acylating agent, diacrylic anhydride or dimethacrylic anhydride may be used instead of acid chloride. Moreover, in an acylation step, by using both of acrylic acid chloride and methacrylic acid chloride, a compound having an acrylamide group and a methacrylamide group in the same molecule can be obtained as an end product.

The compound obtained by the steps described above can be purified from a reaction product liquid by a usual method. For example, it is possible to purify by separation and extraction using an organic solvent, crystallization using a poor solvent, column chromatography using silica gel or the like.

The ink composition of the present invention may be used in combination of two or more kinds of the compound represented by the general formula (1) described above.

In the ink composition of the present invention, the content of the polymerizable compound represented by the general formula (1) described above to the total amount of the ink composition is preferably from 0.1% by mass to 99.9% by mass, more preferably from 0.1% by mass to 45% by mass, further preferably from 0.1% by mass to 20% by mass, and particularly preferably from 1% by mass to 10% by mass. If the content of the polymerizable compound is within the range described above, it is preferred because it is possible to enhance curing properties, furthermore, it is also possible to enhance the storage stability of the ink composition.

(B) Polymerization Initiator

The ink composition of the present invention includes a polymerization initiator. The polymerization initiator is not particularly limited, as long as the polymerization initiator can make the polymerizable compound represented by the general formula (1) described above polymerize, and a normal radical polymerization initiator can be used. The radical polymerization initiator is a compound which generates a radical polymerization initiation species by absorbing an external energy. The radical polymerization initiators are classified broadly into a radical polymerization initiator in which the external energy for initiating the polymerization is heat and a radical polymerization initiator in which the external energy is an active energy ray, however, in the present invention, the photopolymerization initiator which generates the radical polymerization initiation species by an active energy ray is preferably used.

Above all, a water-soluble photopolymerization initiator or an aqueous dispersion of a water-insoluble photopolymerization initiator is preferably used, and a water-soluble photopolymerization initiator is more preferable. Moreover, water-soluble in a photopolymerization initiator has the meaning of 0.5% by mass or more being dissolved in distilled water at 25° C. 1% by mass or more of the water-soluble photopolymerization initiator described above is further preferably dissolved in distilled water at 25° C., and 3% by mass or more is particularly preferably dissolved.

As a photopolymerization initiator which can be used in the ink composition of the present invention, aromatic ketones, an acylphosphineoxide compound, an aromatic onium salt compound, an organic peroxide, a thio compound, a hexaarylbiimidazole compound, a ketoxime ester compound, a borate compound, an azinium compound, a metallocene compound, an active ester compound, a compound having a carbon-halogen bond, an alkylamine compound, and the like are included.

As the preferred examples of aromatic ketones, an acylphosphineoxide compound and a thio compound, a compound having a benzophenone skeleton or a thioxanthone skeleton described in "RADIATION CURING IN POLYMER SCIENCE AND TECHNOLOGY", J. P. FOUASSIER, J. F. RABEK (1993), pp. 77 to 117, or the like is included. As more preferred examples, an α-thiobenzophenone compound described in JP1972-6416B (JP-S47-6416B), a benzoin ether compound described in JP1972-3981B (JP-S47-3981B), an α-substituted benzoin compound described in JP1972-22326B (JP-547-22326B), a benzoin derivative described in JP1972-23664B (JP-S47-23664B), an aroylphosphonic ester described in JP1982-30704A (JP-S57-30704A), dialkoxybenzophenone described in JP1985-26483B (JP-S60-26483B), benzoin ethers described in JP1985-26403B (JP-560-26403B) and JP1987-81345A (JP-562-81345A), α-aminobenzophenones described in JP1989-34242B (JP-H01-34242B), U.S. Pat. No. 4,318,791A, and EP0284561A1B, p-di(dimethylaminobenzoyl)benzene described in JP1990-211452A (JP-H02-211452A), a thio substituted aromatic ketone described in JP1986-194062A (JP-S61-194062A), acylphosphine sulfide described in JP1990-9597B (JP-H02-9597B), acylphosphine described in JP1990-9596B (JP-S02-9596B), thioxanthones described in JP1988-61950B (JP-S63-61950B), coumarins described in JP1984-42864B (JP-S59-42864B), and the like are included. In addition, a polymerization initiator described in JP2008-105379A and JP2009-114290A is also preferable. In addition, a polymerization initiator described in "Ultraviolet light Curing System" written by Kiyomi KATO (General Technology Center Publication: 1989), page 65 to 148, and the like are included.

Among those, a photopolymerization initiator which is suitable for the ink composition of the present invention is aromatic ketones or an acylphosphineoxide compound. Particularly, p-phenyl benzophenone (manufactured by Wako Pure Chemical Industries, Ltd.), bis(2,4,6-trimethylbenzoyl) phenylphosphine oxide (Irgacure 819, manufactured by BASF Japan Ltd.), 2,4,6-trimethylbenzoyl diphenylphosphine oxide (Darocur TPO, manufactured by BASF Japan Ltd.), 2-benzyl-2-dimethylamino-1-(4-morpholinophenyl)-butanone-1 (Irgacure 369, manufactured by BASF Japan Ltd.), 2-methyl-1-(4-methylthiophenyl)-2-morpholinopropan-1-one (Irgacure 907, manufactured by BASF Japan Ltd.), and 1-[4-(2-hydroxyethoxy)-phenyl]-2-hydroxy-2-methyl-1-propane-1-one (Irgacure 2959, manufactured by BASF Japan Ltd.) are preferable, and Irgacure 2959 (manufactured by BASF Japan Ltd.) is most preferable, from the viewpoint of water-soluble and hydrolysis-resistance.

The ink composition of the present invention may include the polymerization initiator as one kind singly or may include two or more kinds.

The content of the polymerization initiator in the ink composition of the present invention is preferably from 0.1% by mass to 20% by mass in solid content conversion, further preferably from 0.5% by mass to 10% by mass, and particularly preferably from 1.0% by mass to 5% by mass.

(C) Monofunctional Polymerizable Compound

The ink composition of the present invention preferably includes a monofunctional polymerizable compound in addition to (A) the polyfunctional polymerizable compound represented by the general formula (1) described above. As a monofunctional polymerizable compound which can be used in the present invention, a (meth)acrylate compound, a (meth)acrylamide compound, a vinyl ether compound, an aromatic vinyl compound, a N-vinyl compound (a polymerizable monomer having an amide bond), and the like described in JP2008-208190A or JP2008-266561A are included. Above all, a (meth)acrylamide compound, a vinyl ether compound, an aromatic vinyl compound, and N-vinyl compound (a polymerizable monomer having an amide bond) are preferably used, and a (meth)acrylamide compound is particularly preferably used, from the viewpoint of enhancing the storage stability. In addition, a (meth)acrylamide compound is preferably used, from the viewpoint of curing properties.

Particularly, from the point of having both of storage stability and curing properties, in the present invention, as a monofunctional polymerizable compound, a monofunctional polymerizable compound having a (meth)acrylamide structure is preferably used.

As a monofunctional polymerizable compound having a (meth)acrylamide structure used in the present invention, a compound represented by the following general formula (2) is preferable.

[Chem. 7]

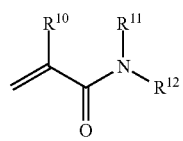

General formula (2)

In the general formula (2) $R^{10}$ represents a hydrogen atom or a methyl group, and a hydrogen atom is preferable.

$R^{11}$ represents a hydrogen atom, a methyl group or an ethyl group, a hydrogen atom and a methyl group are preferable, and a hydrogen atom is more preferable.

$R^{12}$ represent a substituted or unsubstituted alkyl group. As an alkyl group of $R^{12}$, a liner or branched alkyl group having 1 to 6 carbon atoms (for example, a methyl group, an ethyl group, a propyl group, a butyl group, a pentyl group, and a hexyl group) is preferable, an alkyl group having 2 to 4 carbon atoms is more preferable, and an alkyl group having 2 or 3 carbon atoms is particularly preferable.

It is preferred that an alkyl group of $R^{12}$ further have a substituent, as the substituent, an acyl group, a hydroxy group, a tertiary amino group, a quaternary ammonium group or a sulfo group, and the like are included. Above all, $R^{12}$ preferably has an acyl group, a hydroxy group or a dialkylamino group as a substituent and more preferably has a hydroxy group.

In a case where $R^{12}$ has an acyl group as a substituent, the acyl group is represented by —CO—R' (R' is an alkyl group), the acyl group having 2 to 4 carbon atoms is preferable, the acyl group having 2 or 3 carbon atoms is more preferable, and the acyl group having 2 carbon atoms is particularly preferable. As a specific example of the acyl group, —COCH$_3$ is included.

In a case where $R^{12}$ has a tertiary amino group as a substituent, the tertiary amino group is represented by —NR''$_2$ (R'' is a substituent). As R'', a liner or branched alkyl group having 1 to 8 carbon atoms is preferable, an alkyl group having 1 to 4 carbon atoms is more preferable, and an alkyl group having 1 or 2 carbon atoms is particularly preferable. Two R''s may be the same as or different from each other. As a specific example of the tertiary amino group, a dimethylamino group and diethylamine group are included.

In a case where $R^{12}$ has a quaternary ammonium group as a substituent, the quaternary ammonium group is represented by —N$^+$R'''$_3$ (R''' is a substituent). As R''', a liner or branched alkyl group having 1 to 8 carbon atoms is preferable, an alkyl group having 1 to 4 carbon atoms is more preferable, and an alkyl group having 1 or 2 carbon atoms is particularly preferable. Three R'''s may be the same as or different from each other. As a specific example of the quaternary ammonium group, a trimethyl ammonium group and a triethyl ammonium group are included. In addition, as a counter anion of the quaternary ammonium group, a halide ion such as a chloride ion, a bromide ion or an iodide ion, a sulphate ion, and the like are included.

In a case where $R^{12}$ has a sulfo group as a substituent, the sulfo group includes a sulfo group (—SO$_3$H) and a salt thereof (—SO$_3^-$X$^+$). In a case of a salt, as an cation (X$^+$), Li$^+$, Na$^+$, K$^+$, an ammonium cation, a tetramethylammonium cation, and the like are included.

In the general formula (2), $R^{11}$ and $R^{12}$ may be bonded to each other to form a five to eight-membered ring and the five to eight-membered ring may further include at least one kind selected from —O—, —S— and —NR$^b$— as a ring-constituting atom or a group.

A ring structure in which $R^{11}$ and $R^{12}$ may be bonded to each other to form is preferably a five to six-membered ring. The ring in which $R^{11}$ and $R^{12}$ may be bonded to each other to form, preferably further includes at least one kind selected from —O—, —S— and —NR$^b$—, and more preferably includes —O—.

$R^b$ represents a hydrogen atom or an alkyl group having 1 to 4 carbon atoms, is preferably a hydrogen atom or a methyl group, and more preferably a hydrogen atom.

As a specific example of the monofunctional polymerizable compound having a (meth)acrylamide structure represented by the general formula (2) described above, the following compounds (C-1) to (C-13) are included, however, the present invention is not limited thereto.

[Chem. 8]

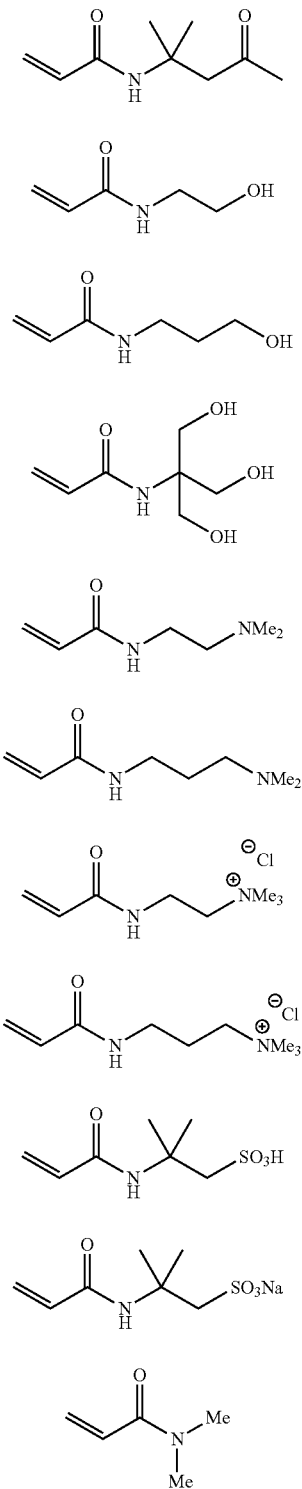

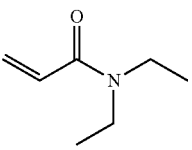

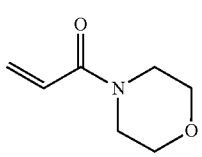

As the compounds (C-1) to (C-13) described above, for example, the following compounds are available.

(C-1): Diacetone acrylamide (manufactured by KYOWA HAKKO CHEMICAL Co., Ltd.)
(C-2): Hydroxyethyl acrylamide (manufactured by Kohjin Co., Ltd.)
(C-3): Hydroxypropyl acrylamide (manufactured by Fluka)
(C-4): N-[1,1-Bis(hydroxymethyl)-2-hydroxyethyl]propenamide (manufactured by Aldrich)
(C-5): N-(2-Dimethylaminoethyl)acrylamide (manufactured by Aldrich)
(C-6): Dimethylaminopropylacrylamide (manufactured by Kohjin Co., Ltd.)
(C-7): 2-(Acryloyloxy)-N,N,N-trimethylethanaminium chloride (manufactured by Kohjin Co., Ltd.)
(C-8): (3-Acrylamidepropyl)trimethylammonium chloride (manufactured by Kohjin Co., Ltd.)
(C-9): 2-Acrylamide-2-methylpropanesulfonic acid (manufactured by TOAGOSEI CO., LTD.)
(C-10): N-[1,1-Dimethyl-2-(sodiooxysulfonyl)ethyl]acrylamide (manufactured by Aldrich)
(C-11): N,N-Dimethyl acrylamide (manufactured by Kohjin Co., Ltd.)
(C-12): N,N-Diethyl acrylamide (manufactured by Kohjin Co., Ltd.)
(C-13): 4-Acryloylmorpholine (manufactured by Kohjin Co., Ltd.)

The content of (C) the monofunctional polymerizable compound in the ink composition of the present invention is preferably from 0.1% by mass to 99.8% by mass, is more preferably from 1% by mass to 45% by mass, is further preferably from 2% by mass to 35% by mass, and is particularly preferably from 10% by mass to 20% by mass. If the content of the monofunctional polymerizable compound is within the range described above, it is preferable because both of the desired curing properties and flexibility can be provided.

(D) Coloring Material

The ink composition of the present invention can be set to a clear ink (a colorless ink) composition which does not include a coloring material or can be set to an ink composition which includes a coloring material (hereinafter, also referred to as an "ink").

As the coloring material which is included, a normal dye, pigment, and the like can be used particular without limitation. Above all, from the viewpoint of the ink colorability, a coloring material which is almost insoluble or is slightly soluble in water is preferably used. Specifically, various kinds of pigments, disperse dyes, oil-soluble dyes, colorings which forms a J-aggregate, and the like are included, however, among those, a pigment is preferable, from the viewpoint of light resistance. As a pigment, any of an organic pigment and an inorganic pigment can be used.

As an organic pigment, an azo pigment, a polycyclic pigment, a dye chelate, a nitro pigment, a nitroso pigment, aniline black, and the like are included. Among those, an azo pigment, a polycyclic pigment, and the like are preferable. As an azo pigment, an azo lake, an insoluble azo pigment, a condensed azo pigment, a chelate azo pigment, and the like are included. As a polycyclic pigment, a phthalocyanine pigment, a perylene pigment, a perinone pigment, an anthraquinone pigment, a quinacridone pigment, a diketopyrrolopyrrole pigment, a dioxazine pigment, an indigo pigment, a thioindigo pigment, an isoindoline pigment, a quinophthalone pigments, and the like are included. As a dye chelate, a basic dye type chelate, an acid dye type chelate, and the like can be used.

As an inorganic pigment, titanium oxide, iron oxide, calcium carbonate, barium sulfate, aluminum hydroxide, barium yellow, cadmium red, chrome yellow, and carbon black can be used. Among those, carbon black is particularly preferable, and carbon black manufactured by a well-known method such as a contact method, a furnace method, or a thermal method, can be used.

More specifically, a pigment described in paragraph 0142 to 0145 of JP2007-100071A, and the like are included, and they are preferably used in the ink composition of the present invention.

In the ink composition of the present invention, a coloring material may be used as one kind singly or may be used by selecting and combining a plurality of kinds of a coloring material from within each group or between each group described above.

The content of the coloring material in the ink composition of the present invention is preferably from 0.5% by mass to 20% by mass, is more preferably from 1% by mass to 15% by mass, and is particularly from 2% by mass to 10% by mass, with respect to the ink composition, from the viewpoint of color consistency, graininess, ink stability, and ejection reliability.

(Pigment Dispersion)

In a case where the ink composition of the present invention includes a pigment, a dispersion in which a pigment is dispersed in an aqueous medium by a dispersing agent (hereinafter, referred to as a color particle dispersion) is preferably used. The pigments described above can be used. As a dispersing agent, a polymeric dispersant, a low-molecular weight surfactant type dispersing agent, and the like can be used, and a polymeric dispersant is preferable.

The color particle dispersion is preferably a color particle dispersion in which after the pigment is dispersed in the aqueous medium by polymeric dispersants, the polymeric dispersants are cross-linked to each other by adding a cross-linking agent, and at least a part of the surface of the pigment is covered by a cross-linked polymer, from the viewpoint of the dispersion stability of the pigment particle and ejecting properties in a case of applying to an ink jet method.

As a polymeric dispersant, a water-soluble polymeric dispersant and a water-insoluble polymeric dispersant can be used, however, the water-insoluble polymeric dispersant is preferable, from the viewpoint of the dispersion stability of the pigment particle and ejecting properties in a case of applying to an ink jet method.

(Water-Insoluble Polymeric Dispersant)

The water-insoluble polymeric dispersant which can be used in the present invention is not particularly limited as long as it is possible to disperse the pigment, an ordinarily water-insoluble polymeric dispersant can be used. For example, a polymer consisting of a hydrophobic constitution unit and a hydrophilic constitution unit can be used as a water-insoluble polymeric dispersant.

As a monomer which is the hydrophobic constitution unit described above, a styrene-based monomer, alkyl(meth)acrylate, an aromatic group-containing (meth)acrylate, and the like are included.

A monomer which is the hydrophilic constitution unit described above is not particularly limited as long as a monomer includes a hydrophilic group, and as a hydrophilic group, a nonionic group, a carboxyl group, a sulfonate group, a phosphate group, and the like are included. Moreover, as a nonionic group, a hydroxy group, an amide group (in which a nitrogen atom is unsubstituted), a group derived from an alkylene oxide polymer (for example, polyethylene oxide, polypropylene oxide, and the like), a group derived from a sugar alcohol, and the like are included. The hydrophilic constitution unit preferably includes at least a carboxyl group and also preferably includes both of a nonionic group and a carboxyl group, from the viewpoint of dispersion stability.

As a water-insoluble polymeric dispersant, specifically, a styrene-(meth)acrylic acid copolymer, a styrene-(meth)acrylic acid ester-(meth)acrylic acid ester copolymer, a (meth)acrylic acid ester-(meth)acrylic acid copolymer, a polyethylene glycol(meth)acrylate-(meth)acrylic acid copolymer, a styrene-maleic acid copolymer, and the like are included.

Moreover, in the present invention, (meth)acrylate represents acrylate and/or methacrylate and (meth)acrylic acid represents acrylic acid and/or methacrylic acid.

The water-insoluble polymeric dispersant is preferably a vinyl polymer including a carboxyl group, and more preferably a vinyl polymer having at least a constitution unit derived from an aromatic group-containing monomer as a hydrophobic constitution unit and having a constitution unit including a carboxyl group as a hydrophilic constitution unit, from the viewpoint of the dispersion stability of the pigment.

The weight average molecular weight of the water-insoluble polymeric dispersant is preferably from 3,000 to 200,000, more preferably from 5,000 to 100,000, further preferably from 5,000 to 80,000, and particularly preferably 10,000 to 60,000, from the viewpoint of the dispersion stability of the pigment.

Moreover, the weight average molecular weight is measured by gel permeation chromatography (GPC). In GPC, HLC-8020 GPC (manufactured by TOSOH CORPORATION) is used, TSKgel Super HZM-H, TSKgel Super HZ4000 and TSKgel Super HZ200 (manufactured by TOSOH CORPORATION, 4.6 mm ID×15 cm) as a column, and THF (tetrahydrofuran) as an eluent are used.

A coloring material which is included in the ink composition of the present invention is preferably configured by including the pigment and the water-insoluble polymeric dispersant, and is preferably the color particles which is configured by at least a part of the surface of the pigment being covered by the water-insoluble polymeric dispersant.

Such the color particles, for example, can be obtained as a color particle dispersion by dispersing a mixture including a pigment, a dispersing agent, and a solvent (preferably an organic solvent) as necessary, or the like by using a disperser. Specifically, for example, after a step of adding an aqueous liquid including a basic substance to a mixture of the pigment, the water-insoluble polymeric dispersant and an organic solvent for dissolving or dispersing the dispersing agent (a step of mixing and hydrating), it is possible to prepare the color particle dispersion by providing a step of removing the organic solvent (a step of removing a solvent). According to the method, the pigment is finely dispersed, and thus, it is possible to obtain the color particle dispersion having excellent storage stability.

As the volume average particle diameter of the color particle dispersion, from 10 nm to 200 nm is preferable, from 10 nm to 150 nm is further preferable, and from 10 nm to 100 nm is particularly preferable. By the volume average particle diameter being 200 nm or less, the color reproducibility becomes favorable, furthermore, the droplet shooting characteristics become favorable in a case of an ink jet method. In addition, by the volume average particle diameter being 10 nm or more, the light resistance becomes favorable.

There is no particular limitation relating to the particle size distribution of the color particles (the coloring material), and any one having a wide particle size distribution or having a monodispersed particle size distribution is sufficient. In addition, two or more kinds of the coloring material having a monodispersed particle size distribution may be mixed and used. Moreover, the volume average particle diameter and the particle size distribution, for example, can be measured using a light scattering method.

In the ink composition of the present invention, such a color particle dispersion may be used as one kind singly or two or more kinds in combination.

In the color particle dispersion, from 10% by mass to 100% by mass of the dispersing agent is preferably used, from 20% by mass to 70% by mass is more preferable, and from 30% by mass to 50% by mass is particularly preferable, with respect to the pigment. By setting the content of the dispersing agent to the pigment to the range described above, the pigment particle is covered by the dispersing agent with a proper quantity, and thus, it is possible to obtain color particles having excellent dispersibility, dispersion stability and colorability.

The color particle dispersion may include other dispersing agent in addition to the water-insoluble polymeric dispersant. For example, a water-soluble low molecular weight dispersing agent, a water-soluble polymer which is usually used, or the like can be used. The dispersing agents except the water-insoluble polymeric dispersant can be used within the range of the content described above of the dispersing agent.

(E) Solvent

The ink composition of the present invention preferably includes a solvent. As a solvent, water, an organic solvent and a mixture thereof are included. The ink composition of the present invention can use only an organic solvent as a solvent, however, the solvent is preferably a solvent which includes at least water and using water is particularly preferable, from the viewpoint of reducing environmental load and enhancing safety. By using water as a solvent, the polymerizable compound described before, represented by the general formula (1) is also successfully dissolved. As to water, water such as deionized water or distilled water, which does not include ionic impurities is more preferable. The content of water in the ink composition of the present invention is preferably from 10% by mass to 95% by mass, more preferably from 30% by mass to 90% by mass, and particularly preferably from 50% by mass to 80% by mass.

Since an anti-dry effect or a penetration enhancement effect of an ink to a paper can be expected, the organic solvent may be used in the present invention, however, in this case, it is preferable to use water together, and it is more preferable to use in a range which does not deteriorate characteristics such as safety, which water has. With consideration of using water together, the water-soluble organic solvent is more preferably used. In addition, in order to prevent an ink discharge port from clogging by the ink composition which is adhered in the vicinity of an ink discharge port of an injection nozzle being dried and solidified, the organic solvent in which the vapor pressure is lower than water is preferably used.

As a specific example of the organic solvent which can be used in the present invention, for example, an alkanediol (polyalcohols) such as glycerin, 1,2,6-hexanetriol, trimethylolpropane, ethyleneglycol, and propyleneglycol; sugar alcohols; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol, dipropylene glycol monomethyl ether, dipropylene glycol monoethyl ether, dipropylene glycol mono-n-propyl ether, dipropylene glycol mono-isopropyl ether, and tripropylene glycol monomethyl ether; are included.

As a purpose of preventing from drying, polyalcohols are useful. For example, glycerin, ethylene glycol, diethylene glycol, triethylene glycol, propylene glycol, dipropylene glycol, triethylene glycol, 1,3-butanediol, 2,3-butanediol, and the like are included.

As a purpose of penetration enhancement, an aliphatic diol is suitable. As an aliphatic diol, for example, 2-ethyl-2-methyl-1,3-propanediol, 3,3-dimethyl-1,2-butanediol, 2,2-diethyl-1,3-propanediol, 2-ethyl-1,3-hexanediol, 2,2,4-trimethyl-1,3-pentanediol, and the like are included. Among those, 2-ethyl-1,3-hexanediol, and 2,2,4-trimethyl-1,3-pentanediol can be included as a preferred example.

In addition, at least one kind of the compound represented by the following structural formula (X) is preferably included as an organic solvent, from the point of suppressing the occurrence of curling in a recording medium.

[Chem. 9]

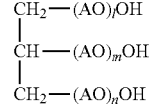

Structural formula (X)

In the structural formula (X), l, m and n each independently represent an integer of 1 or more and satisfy $l+m+n=3$ to 15, and $l+m+n$ is preferably in a range from 3 to 12 and more preferably in a range from 3 to 10. If the value of $l+m+n$ is 3 or more, excellent restraint of curling is exhibited, and if 15 or less, excellent ejecting properties can be obtained. In the structural formula (X), AO represents at least one of ethyleneoxy (EO) and propyleneoxy (PO), and above all, a propyleneoxy group is preferable. Each AO in $(AO)_l$, $(AO)_m$, and $(AO)_n$ described above may be, respectively, the same or different.

Specific examples of the compound represented by the following structural formula (X) are shown. Moreover, in the following compounds, a description of "POP(3)glyceryl ether" has the meaning of being a glyceryl ether in which three propyleneoxy groups in total are bonded to glycerin, and other description is the same.

[Chem. 10]

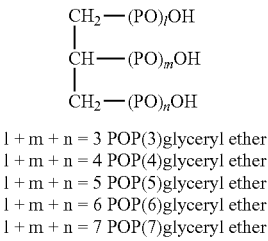

1 + m + n = 3 POP(3)glyceryl ether
1 + m + n = 4 POP(4)glyceryl ether
1 + m + n = 5 POP(5)glyceryl ether
1 + m + n = 6 POP(6)glyceryl ether
1 + m + n = 7 POP(7)glyceryl ether Furthermore, it is preferred that the compounds (a) to (g) which are exemplified described below be also included as an organic solvent, from the point of suppressing the occurrence of curling in a recording medium. Moreover, AO represents at least one of ethyleneoxy (EO) and propyleneoxy (PO).
(a) n-$C_4H_9O(AO)_4$—H (AO=EO or PO, and the ratio is EO:PO=1:1) (manufactured by NOF CORPORATION)
(b) n-$C_4H_9O(AO)_{10}$—H (AO=EO or PO, and the ratio is EO:PO=1:1) (manufactured by NOF CORPORATION)
(c) HO$(AO)_{40}$—H (AO=EO or PO, and the ratio is EO:PO=1:3) (manufactured by NOF CORPORATION)
(d) HO$(AO)_{55}$—H (AO=EO or PO, and the ratio is EO:PO=5:6) (manufactured by NOF CORPORATION)
(e) HO$(PO)_3$—H(PP-200, manufactured by Sanyo Chemical Industries, Ltd.)
(f) HO$(PO)_7$—H(PP-400, manufactured by Sanyo Chemical Industries, Ltd.)
(g) 1,2-hexanediol (manufactured by Ube Industries, Ltd.)

The organic solvent described above may be used as one kind singly or may be used by mixing two or more kinds. The content of the organic solvent is preferably from 0% by mass to 40% by mass, further preferably from 0% by mass to 20% by mass, and particularly preferably from 0% by mass to 10% by mass, with respect of the total amount of the ink composition.

In addition, the ratio of the content of the compound represented by the structural formula (X) described above and the compounds (a) to (g) described above occupied in all water-soluble organic solvent is preferably 3% by mass or more, more preferably 4% by mass or more, and further preferably 5% by mass or more. By setting to within the range, it is possible to suppress curling without deteriorating stability or ejecting properties of an ink.

(Sensitizer)

The ink composition of the present invention may include a sensitizer such as a sensitized dye in addition to the components described above, and including a sensitizer is preferable. An ordinary sensitized dye can be used and a sensitized dye is not particularly limited, however, with consideration of characteristics of the ink composition of the present invention, a sensitized dye which has excellent solubility to water or the water-soluble organic solvent is preferable. Specifically, a sensitized dye in which 0.5% by mass or more is dissolved is preferable, a sensitized dye in which 1% by mass or more is dissolved is more preferable, and a sensitized dye in which 3% by mass or more is dissolved is particularly preferable, with respect to distilled water at room temperature. In addition, as a sensitized dye, the polymerization initiator in which the water-insoluble polymerization initiator is dispersed in the water-soluble medium or the like can be also used.

As an example of the sensitized dye which can be used together in the ink composition of the present invention, N-[2-hydroxy-3-(3,4-dimethyl-9-oxo-9H-thioxanthen-2-yloxy)propyl]-N,N,N-trimethyl aluminum chloride, benzophenone, thioxanthone, an anthraquinone derivative, a 3-acyl coumarin derivative, terphenyl, a styryl ketone, 3-(aroylmethylene)thiazoline, camphorquinone, eosin, rhodamine, erythrosine, and a denaturation body and a dispersion which solubilize those, and the like are included. In addition, a sensitized dye described in JP2010-24276A or a sensitized dye described in JP1994-107718A (JP-H06-107718A) is also suitably used in the present invention.

(Resin Particles)

The ink composition of the present invention may include the resin particles, as necessary. As the resin particles, an acrylic-based resin, a vinyl acetate-based resin, a styrene-butadiene-based resin, a vinyl chloride-based resin, an acrylic-styrene-based resin, a butadiene-based resin, a styrene-based resin, a cross-linked acrylic resin, a cross-linked styrene-based resin, a benzoguanamine resin, a phenol resin, a silicone resin, an epoxy resin, a urethane-based resin, a paraffin-based resin, a fluorinate-based resin, and the like or latexes thereof can be used. Among those, an acrylic-based resin, an acrylic-styrene-based resin, a styrene-based resin, a cross-linked acrylic resin, and a cross-linked styrene-based resin are preferable.

The weight average molecular weight of the resin particles is preferably from 10,000 to 200,000 and further preferably from 100,000 to 200,000. The weight average molecular weight can be measured in the same way as the case of the water-insoluble polymeric dispersant described earlier.

The volume average particle diameter of the resin particles is preferably from 10 nm to 1 μm, further preferably from 15 nm to 200 nm, and particularly preferably from 20 nm to 50 nm. There is no particular limitation relating to the particle size distribution of the resin particles, and any one having a wide particle size distribution or having a monodispersed particle size distribution is sufficient. In addition, two or more kinds of resin particles having a monodispersed particle size distribution may be mixed and used. The volume average particle diameter and the particle size distribution can be measured in the same way as the case of the color particle dispersion described earlier.

In addition, the glass transition temperature of the resin particles is preferably 30° C. or higher, further preferably 40° C. or higher, and particularly preferably 50° C. or higher. Moreover, the measured Tg obtained by an actual measurement is applied to the glass transition temperature in the present invention. Specifically, the measured Tg means the value which is measured under the normal measurement conditions by using differential scanning calorimetry (DSC) EXSTAR 6220 manufactured by SII Nano Technology Inc.

The content of the resin particles described above is preferably from 0% by mass to 20% by mass, further preferably from 0% by mass to 10% by mass, and particularly preferably from 0% by mass to 5% by mass with respect to the ink composition.

(Surfactant)

The ink composition of the present invention may include a surfactant as a surface tension adjusting agent, as necessary. As a surfactant, it is possible to use any of an anionic surfactant, a cationic surfactant, an amphoteric surfactant, a nonionic surfactant, and a betaine-based surfactant. In addition, the dispersing agent (the polymeric dispersant) described above may be used as a surfactant. Above all, in the ink composition of the present invention, a nonionic surfactant is preferably used, and an acetylene glycol derivative is particularly preferable.

The content of the surfactant in the ink composition is not particularly limited, however, with consideration of an application of an ink, or the like, it is preferred that the content be appropriately adjusted so that the appropriate surface tension is obtained.

For example, in a case where the ink composition of the present invention is used as an ink for ink jet recording, from the viewpoint of favorably performing the ejection of the ink composition, the surface tension of the ink composition is preferably set to 20 mN/m to 60 mN/m, more preferably set to 20 mN/m to 45 mN/m, and particularly preferably set to 25 mN/m to 40 mN/m. In this case, the content of the surfactant in the ink composition is preferably adjusted so that the surface tension is set to within the range described above. Specifically, 1% by mass or more is preferable, from 1% by mass to 10% by mass is further preferable, and from 1% by mass to 3% by mass is particularly preferable, with respect the ink composition.

(Other Components)

The ink composition of the present invention may include other components in addition to each component described above. As the other components, various kinds of known additives such as an ultraviolet absorbing agent, an anti-fading agent, a fungicide, a pH adjusting agent, an anti-rust agent, an antioxidant, an emulsion stabilizer, a preservative, an antifoaming agent, a viscosity-adjusting agent, a dispersion stabilizer, a chelating agent, a solid wetting agent, and the like are included.

As an ultraviolet absorbing agent, a benzophenone-based ultraviolet absorbing agent, a benzotriazole-based ultraviolet absorbing agent, a salicylate-based ultraviolet absorbing agent, a cyanoacrylate-based ultraviolet absorbing agent, a nickel complex salt-based ultraviolet absorbing agent, and the like are included.

As an anti-fading agent, various kinds of organic-base and metal complex-base anti-fading agents can be used. As an organic-base anti-fading agent, hydroquinones, alkoxyphenols, dialkoxyphenols, phenols, anilines, amines, indanes, coumarones, alkoxyanilines, heterocycles and the like are included. As a metal complex-base anti-fading agent, a nickel complex, a zone complex, and the like are included.

As a fungicide, sodium dehydroacetate, sodium benzoate, sodium pyridinethione-1-oxide, p-hydroxybenzoic acid ethyl ester, 1,2-benzisothiazolin-3-one, sodium sorbate, sodium pentachlorophenol, and the like are included. The fungicide described above is preferably included in a range from 0.02% by mass to 1.00% by mass in the ink composition.

As a pH adjusting agent, there is no particular limitation as long as the pH adjusting agent is a compound which can adjust the pH to the desired value without any harmful effects to the ink composition which is prepared. For example, alcohol amines (for example, diethanolamine, triethanolamine, 2-amino-2-ethyl-1,3-propanediol or the like), an alkali metal hydroxide (for example, lithium hydroxide, sodium hydroxide, potassium hydroxide, or the like), an ammonium hydroxide (for example, ammonium hydroxide, a quaternary ammonium hydroxide, or the like), a phosphonium hydroxide, an alkali metal carbonate, and the like are included.

As an anti-rust agent, acid sulfite, sodium thiosulfate, ammonium thiodiglycolate, diisopropyl ammonium nitrite, pentaerythritol tetrahydrochloride, dicyclohexyl ammonium nitrate, and the like are included.

As an antioxidant, a phenolic-based antioxidant (a hindered phenol-based antioxidant is included), an amine-based antioxidant, a sulphur-based antioxidant, a phosphorus-based antioxidant, and the like are included.

As a chelating agent, ethylenediamine tetraacetic acid sodium, nitrilotriacetic acid sodium, hydroxyethyl ethylene diamine triacetic acid sodium, diethylenetriamine pentaacetic acid sodium, uramiru diacetic acid sodium, and the like are included.

[Ink Composition]

The ink composition of the present invention includes (A) the polymerizable compound represented by the general formula (1) described above and (B) the polymerization initiator, and preferably, further includes (C) the monofunctional polymerizable compound, (D) the coloring material, and (E) the solvent. By including the polymerizable compound represented by the general formula (1), the ink composition of the present invention can be used as a curable type ink, and preferably as a curable type aqueous ink, furthermore, is provided with preferable nature as an ink for ink jet recording.

The compound represented by the general formula (1) described above is provided with four carbon-carbon double bonds, has high polymerizing ability, and can give excellent curing properties to the ink composition. Therefore, in the ink composition of the present invention including the compound, after forming an image, for example, by imparting an active energy ray, energy such as heat, the formed image is immediately cured and fixed. As a result of that, print through, or the like is prevented when printing, and thus it is possible to enhance the print speed.

In addition, since the compound represented by the general formula (1) described above does not have an —O—C—N— structure in which three oxygen atoms derived from a hydroxy group of polyol which is a row material and a nitrogen atom of a (meta)acrylamide group are bond to the same carbon atom (that is, since an oxygen atom and a (meta)acrylamide group are not linked through a methylene group), it is possible to suppress hydrolysis of the compound. Therefore, in the ink composition using the compound, it is considered that the storage stability is enhanced.

Furthermore, the compound represented by the general formula (1) described above has excellent solubility to water. Therefore, it is possible to set the ink composition of the present invention including the compound to an aqueous ink using water or the water-soluble organic solvent as a medium. Since it is possible to avoid to use a high noxious organic solvent, in the aqueous ink, safety is excellent and it is possible to reduce environmental and work load. In addition, since it is easy to adjust the viscosity, the ink including the water-soluble polymerizable compound can suitably be used as an ink for ink jet recording in which an ejection recovery property is required.

In the ink composition of the present invention, a preferred embodiment is to include (C) the monofunctional polymerizable compound (particularly preferably monofunctional polymerizable compound having a (meth)acrylamide structure) in addition to (A) the polyfunctional polymerizable compound represented by the general formula (1) described above. By using the monofunctional polymerizable compound together, an ejection recovery property after stopping of printing followed by leaving for a predetermined time and the lapse of a time of printing and the flexibility of the formed image are enhanced particularly in an ink jet type (an ink jet method). The mechanism is not well understood, however, after ejecting the ink composition, when water is evaporated from the ink composition and the ink composition is concentrated while the ejecting part is left, since viscosity rise is moderated, it is clarified that an ejection recovery property is enhanced. In addition, in a case where only polyfunctional polymerizable compound is used, since a cross-linked structure is strongly formed, there is some possibility that a cured film (image) becomes brittle, however, by using the monofunctional polymerizable compound together, it is possible to decrease the density of the degree of cross-link-age in the cured film, and as a result, it is considered that the moderate flexibility can be imparted to the cured film. Moreover, the mechanism described above is conjecture, however, the present invention is not limited to the mechanism described above.

The ratio of content of (A) the polyfunctional polymerizable compound represented by the general formula (1) and (C) the monofunctional polymerizable compound in the ink composition of the present invention is preferably (A):(C)=1:99 to 90:10, more preferably (A):(C)=10:90 to 70:30, further preferably (A):(C)=15:85 to 65:35, and particularly preferably (A):(C)=20:80 to 55:45, as mass standard. If the ratio of content of (C) to (A) is within the range described above, in all the curing properties, storage stability and ejection recovery property of an ink, and flexibility of an image, excellent performance can be exhibited, therefore it is preferable.

The viscosity and the surface tension of the ink composition of the present invention can appropriately be selected and adjusted depending on an application of the ink composition or an image forming method.

For example, in a case where the ink composition of the present invention is used as an ink for ink jet recording, the viscosity of the ink composition is preferably from 1.2 mPa·s to 15.0 mPa·s, more preferably 2 mPa·s or more and less than 13 mPa·s, and particularly preferably 2.5 mPa·s or more and less than 10 mPa·s.

[Image Forming Method]

The image forming method of the present invention includes an ink adding step of adding the ink composition of the present invention onto the recording medium, and an irradiating step of irradiating with an active energy ray to the ink composition added described earlier. Furthermore, the image forming method of the present invention may include a processing liquid adding step of adding a processing liquid including a flocculant which can form aggregates by coming into contact with the components of the ink composition onto the recording medium.

(Recording Medium)

The recording medium used in the image forming method of the present invention is not particularly limited, general printing paper which is mainly composed of cellulose and used in a general offset printing, paper for exclusive use for ink jet, paper for exclusive use for photo, electrophotography common-use paper, film (resin film, or the like), cloth, glass, metal, pottery, and the like can be used.

As a recording medium, above all, so-called coated paper used for general offset printing and the like is preferable. Coated paper is provided with a coating layer by applying a coating material on the surface of high-quality paper, neutral paper or the like mainly composed of cellulose and generally not surface processed. In an ink jet recording using a normal aqueous ink, since the absorption and drying of an ink is relatively slow, coated paper is apt to suffer problems relating to quality such as color consistency, glossiness, rubfastness and the like; however, according to the image forming method of the present invention, it is possible to obtain an image having excellent color consistency, glossiness and rubfastness. In particular, it is preferable to use coated paper having a coating layer including a base sheet and an inorganic pigment, and it is more preferable to use coated paper having a coated layer including a base sheet and kaolin and/or calcium bicarbonate. Specifically, art paper, coated paper, lightweight coated paper, or fine coated paper is more preferable.

As the coated paper, it is possible to use the ones which are generally commercially available, for example, art paper (A1) such as "OK Kinfuji+" manufactured by Oji Paper Co., Ltd. and "Tokubishi Art" manufactured by Mitsubishi Paper Mills Ltd., coated paper (A2, B2) such as "OK Top Coat+" manufactured by Oji Paper Co., Ltd. and "Aurora Coat" manufactured by Nippon Paper Industries Co., Ltd., and the like, matt coated paper such as "U-LITE" manufactured by Nippon Paper Industries Co., Ltd., lightweight coated paper (A3) such as "OK Coat L" manufactured by Oji Paper Co., Ltd. and "Aurora L" manufactured by Nippon Paper Industries Co., Ltd., fine coated paper such as "OK Everlight Coat" manufactured by Oji Paper Co., Ltd. and "Aurora S" manufactured by Nippon Paper Industries Co., Ltd., and the like are included.

(Ink Adding Step)

As a method of adding the ink composition of the present invention onto the recording medium, there is no particular limitation as long as the ink composition can be added to form the desired image-like, and various kinds of ink adding methods which are usually used can be used. For example, a relief method, a plate method, an intaglio method, a mimeograph method, an ink jet method, and the like are included. Above all, from the viewpoint in which the ink composition of the present invention is particularly suitable as an ink for ink jet recording and of the compactification and the high-speed recordability of a recording device, the ink adding step is preferably performed by adding the ink composition onto the recording medium by an ink jet method.

(Ink Jet Method)

In an ink jet method, by giving energy to the ink composition, the ink composition is ejected from an ink ejection head, and a colored image is formed onto the recording medium.

The ink jet method which is used in the image forming method of the present invention is not particularly limited and any well-known method such as, for example, a thermal ink jet (bubble jet (registered trademark)) method of heating the ink, forming bubbles, and using the generated pressure, an electric charge control method of using electrostatic attraction to eject ink, a drop-on-demand method (pressure pulse method) of using vibration pressure of piezo elements, a sound method of changing an electrical signal into a sound beam, irradiating to the ink and ejecting the ink using radiation pressure, and the like can be applied.

In addition, the ink jet method may be an on-demand type or may be a continuous type. Furthermore, the ink nozzles and the like which are used are not particularly limited; however, they can be appropriately selected according to the purpose.

Here, the ink jet method described above includes a method of ejecting low concentration ink known as photo ink in a small volume many times, a method of improving the image quality using a plurality of inks of different concentrations with substantially the same hue, and a method of using colorless transparent ink.

In addition, as an ink jet method, there is a shuttle type of using a short serial head (short head) and performing recording while causing the serial head to scan in the width direction of the recording medium and a line type of using a line head in which recording elements are arranged corresponding to the entire area of one side of the recording medium. In the line type, it is possible to perform image recording over the whole surface of the recording medium by scanning the recording medium in the direction perpendicular to the arrangement direction of the recording elements and a transport system for a carriage or the like scanning the short head is unnecessary.

In addition, since complicated scanning control of the movement of the carriage and the recording medium is unnecessary and only the recording medium is moved, it is possible to realize an increase in the recording speed in comparison with the shuttle type.

More specifically, in the image forming method of the present invention, an ink jet method described in paragraphs 0093 to 0105 of JP2003-306623A can preferably be applied.

(Processing Liquid Adding Step)

The image forming method of the present invention preferably includes a processing liquid adding step of adding a processing liquid including a flocculant which can form aggregates by coming into contact with the components of the ink composition onto the recording medium. The processing liquid adding step may be arranged either before or after the ink adding step. In the image forming method of the present invention, an embodiment in which the ink adding step is arranged after the processing liquid adding step is preferable.

Specifically, an embodiment in which before adding the ink composition, the processing liquid is added for agglutinating the coloring material (pigment, or the like) and/or the polymer particles in the ink composition onto the recording medium in advance and ink composition is added so as to come into contact with the processing liquid added onto the recording medium is preferable. By performing the steps, it is possible to increase the speed of the image recording, and an image which has high concentration and high-resolution even with high-speed recording is obtained.

As an example of the processing liquid, a liquid composition which can generates aggregates by changing the pH of the ink composition is included. At this time, the pH (25° C.) of the processing liquid is preferably from 0 to 6, more preferably from 0.3 to 3, and further preferably from 0.5 to 2, from the viewpoint of the rate of aggregation of the ink composition. In this case, the pH (25° C.) of the used ink composition described above is preferably from 7.5 to 9.5, and more preferably from 8.0 to 9.0.

Above all, in the present invention, a case where the pH (25° C.) of the ink composition described above is 7.5 or more and the pH (25° C.) of the processing liquid is from 0.5 to 2 is preferable, from the viewpoint of the image concentration, the resolution and an increase in speed of an ink jet recording.

The processing liquid which can be used in the present invention is a composition which can form aggregates when coming into contact with the ink composition. Specifically, when the processing liquid and the ink composition are mixed, the processing liquid can be configured by including at least one kind of an aggregate component which is capable of forming aggregates by agglutinating the dispersion particles such as the coloring material (pigment, colored particle, or the like described above) in the ink composition and by including other components, as necessary. By mixing the processing liquid including an aggregate component which is capable of forming aggregates by coming into contact with the ink composition and the ink composition, the aggregate of pigment, or the like which is stably dispersed in the ink composition is promoted.

The processing liquid preferably includes at least one kind of an acid compound, as an aggregate component. As an acid compound, a compound having a phosphoric acid group, a phosphonic acid group, a phosphinic acid group, a sulfate group, a sulfonic acid group, a sulfinic acid group, or a carboxyl group, or a salt thereof (for example, a multivalent metal salt) can be used. Above all, from the viewpoint of the rate of aggregation of the ink composition, a compound having a phosphoric acid group or a carboxyl group is more preferable, and a compound having a carboxyl group is further preferable.

As a compound having a carboxyl group, it is preferable to select from polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, a derivative thereof, a salt thereof (for example, a multivalent metal salt), or the like. The compound having a carboxyl group may be used as one kind or may be used as two or more kinds together.

The aggregate component described above can be used as one kind singly or may be used by mixing two or more kinds. As the content of an acid compound in the processing liquid, from 5% by mass to 95% by mass is preferable, and from 10% by mass to 80% by mass is more preferable, with respect to the total mass of the processing liquid, from the viewpoint of the aggregating effect.

The processing liquid can be configured by further including an aqueous solvent (for example, water, the water-soluble organic solvent, or the like), in addition to the acid compound described above. In addition, the processing liquid may be configured by appropriately including various kinds of additives such as a surfactant.

In addition, as a preferred example of the processing liquid for enhancing high-speed aggregability, the processing liquid in which a multivalent metal salt or polyallylamine is added is also included. As a multivalent metal salt, alkaline-earth metals of the group 2 in the periodic table (for example, magnesium, calcium), transition metals of the group 3 in the periodic table (for example, lanthanum), cations from the group 13 in the periodic table (for example, aluminum), salts of lanthanides (for example, neodymium), polyallylamine and polyallylamine derivatives are included. As a metal salt, a carboxylate (a salt of formic acid, acetic acid, benzoate acid, or the like), a nitrate, a chloride, and thiocyanate are preferred. Above all, a calcium salt or a magnesium salt of carboxylic acid (a salt of formic acid, acetic acid, benzoate acid, or the like), a calcium salt or a magnesium salt of nitric acid, calcium chloride, magnesium chloride, and a calcium salt or a magnesium salt of thiocyanic acid are preferable.

As the content of a metal salt in the processing liquid, the range from 1% by mass to 10% by mass is preferable, the range from 1.5% by mass to 7% by mass is more preferable, and the range from 2% by mass to 6% by mass is further preferable.

As the viscosity of the processing liquid, the range from 1 mPa·s to 30 mPa·s is preferable, the range from 1 mPa·s to 20 mPa·s is more preferable, the range from 1 mPa·s to 15 mPa·s is further preferable, and the range from 1 mPa·s to 10 mPa·s is particularly preferable, from the viewpoint of the rate of aggregation of the ink composition. Moreover, the viscosity is measured under the conditions of 20° C. by using VISCOMETER TV-22 (manufactured by TOKI SANGYO CO., LTD.).

In addition, as the surface tension of the processing liquid, the range from 20 mN/m to 60 mN/m is preferable, the range from 20 mN/m to 45 mN/m is more preferable, and the range from 25 mN/m to 40 mN/m is further preferable, from the viewpoint of the rate of aggregation of the ink composition. Moreover, the surface tension is measured under the conditions of 25° C. by using Automatic Surface Tensiometer CBVP-Z (manufactured by Kyowa Interface Science Co., LTD.)

The adding of the processing liquid can be performed by applying a well-known method such as a coating method, an ink jet method, or a dipping method. As the coating method, it is possible to perform by well-known coating methods using a bar coater, an extrusion die coater, an air doctor coater, a blade coater, a rod coater, a knife coater, a squeeze coater, a reverse roll coater, and the like. The details of the ink jet method are as previously described.

The addition amount of the processing liquid is not particularly limited as long as it is possible to agglutinate the ink composition; however, preferably, it is possible to set the amount to one at which the addition amount of the flocculant becomes 0.5 $g/m^2$ to 4.0 $g/m^2$. Among these, an amount at which the addition amount of the flocculant becomes 0.9 $g/m^2$ to 3.75 $g/m^2$ is preferable. When the addition amount of the flocculant is 0.5 $g/m^2$ or more, it is possible to maintain favorable high-speed aggregability according to the various types of usage patterns of the ink composition. In addition, it is preferable that the addition amount of the flocculant be 4.0 $g/m^2$ or less, from the viewpoint that there is no adverse influence (change in the gloss, or the like) on the surface property of the added recording medium.

(Heating and Drying Step)

In the image forming method of the present invention, after the processing liquid adding step, the ink adding step is provided, and after adding the processing liquid onto the recording medium, it is preferable that a heating and drying step of heating and drying the processing liquid on the recording medium be further provided in the time until the ink composition is added. By heating and drying the processing liquid in advance before the ink adding step, the ink colorability such as bleeding prevention becomes favorable and it is possible to record a visible image with a favorable color consistency and hue.

The heating and drying can be performed by well-known heating means such as a heater, air blowing means for using blown air such as a dryer, or means for combining these. As the heating method, for example, a method of applying heat with a heater or the like from the opposite side of the side of adding the processing liquid of the recording medium, a method of blowing warm air or hot air onto the side of adding the processing liquid of the recording medium, a heating method of using an infrared heater and the like are included, and heating may be performed using a combination of a plurality of these.

(Active Energy Ray Irradiating Step)

After the ink adding step, the ink composition added onto the recording medium is irradiated with an active energy ray. By irradiating with an active energy ray, the polymerizable compound in the ink composition is cured, the cured film including the coloring material is formed, and thus it is possible to fix an image.

In the image forming method of the present invention, as an active energy ray, an α ray, a γ ray, an electron beam, an X ray, an ultraviolet ray, visible light, infrared light, and the like can be used. Out of these active energy rays, an ultraviolet ray, visible light and infrared light are preferable, and an ultraviolet (UV) ray is more preferable, from the viewpoint of safety, or the like. As the wavelength of the active energy ray, for example, from 200 nm to 600 nm is preferable, from 250 nm to 450 nm is further preferable, and from 250 to 400 nm is particularly preferable.

The output of the active energy ray is preferably 5,000 $mJ/cm^2$ or less, further preferably from 10 $mJ/cm^2$ to 4,000 $mJ/cm^2$, and particularly preferably from 20 $mJ/cm^2$ to 3,000 $mJ/cm^2$.

As a device which can be irradiated with an active energy ray, there are an exposure device in which a LED lamp, a mercury lamp such as a high-pressure mercury lamp, an extra-high pressure mercury lamp, a Deep UV lamp, a low-pressure UV lamp, an excimer lamp such as a halide lamp, a xenon flash lamp, a metal halide lamp, an ArF excimer lamp, an KrF excimer lamp, an extreme ultraviolet light lamp, an electron beam, and an X ray lamp are set to the light source. The irradiation with ultraviolet rays can be performed by using a normal ultraviolet ray irradiating device, for example, an ultraviolet ray irradiating device for curing/adhering/exposing (USHIO INC. SP9-250UB, or the like), which is commercially available.

In addition, a light-emitting diode (LED) and a laser diode (LD) are also used, as a source of an active energy ray. A LED (UV-LED) and a LD (UV-LD) are small-size, long-life, high efficiency, and low cost, and are expected as a light source for photo curable type ink jet. Particularly, in a case where an ultraviolet light source is required, an ultraviolet LED and an ultraviolet LD can be used. For example, NICHIA CORPORATION places the ultraviolet LED having the wavelength in which a main emission spectrum has a wavelength between 365 nm and 420 nm on the market.

An active energy ray source used for the image forming method of the present invention is preferably a mercury lamp or a metal-halide lamp.

(Ink Drying Step)

In the image forming method of the present invention, an ink drying step of removing by drying an ink solvent (for example, water, an organic solvent, or the like) in the ink composition added onto the recording medium may be provided, as necessary.

The ink drying step only has to be performed after the ink adding step and may be before or after the active energy ray irradiating step, however, the ink drying step is preferably performed before the active energy ray irradiating step.

In the ink drying method, at least a part of an ink solvent only has to be removed, methods which are usually used can be applied. For example, heating by using a heater or the like, air blowing by using a dryer or the like, or methods of combining these can be performed.

EXAMPLE

Hereinafter, the present invention will be described in more detail base on Examples, however, the present invention is not limited to Examples thereof. Here, unless otherwise specified, 'part' and '%' are based on mass.

(Synthesis of Polymeric Dispersant P-1)

88 g of methyl ethyl ketone was added into a three-necked flask with a volume of 1,000 ml, provided with a stirrer and a condenser and was heated to 72° C. under a nitrogen atmosphere, and a solution in which 0.85 g of dimethyl 2,2'-azobisisobutyrate, 60 g of benzyl methacrylate, 10 g of methacrylic acid and 30 g of methyl methacrylate were dissolved in 50 g of methyl ethyl ketone was added dropwise thereto over 3 hours. After the dropwise addition was finished, after reacting for further 1 hour, a solution in which 0.42 g of dimethyl 2,2'-azobisisobutyrate was dissolved in 2 g of methyl ethyl ketone was added, was heated up to 78° C., and was heated for 4 hours. The obtained reaction solution was reprecipitated in a large excess of hexane twice, the deposition resin was dried, and 96 g of the polymeric dispersant P-1 was obtained.

The composition of the obtained resin was confirmed by $^1$H-NMR and the weight average molecular weight (Mw) determined by GPC was 44,600. Furthermore, when the acid value was determined by the method described in JIS standard (JISK0070: 1992), the acid value was 65.2 mgKOH/g.

(Preparation of Resin-Coated Pigment Dispersion)
—Resin-Coated Cyan Pigment Dispersion—

10 parts of Pigment Blue 15:3 (Phthalocyanine blue A220, manufactured by Dainichiseika Color & Chemicals Mfg., Ktd.), 5 parts of the polymeric dispersant P-1, 42 parts of methyl ethyl ketone, 5.5 parts of 1 mol/L NaOH aqueous solution and 87.2 parts of ion-exchanged water were mixed and dispersed for 2 hours to 6 hours using 0.1 mmϕ zirconia beads by a bead mill.

By removing methyl ethyl ketone from the obtained dispersion at 55° C. under reduced pressure and further removing a part of water, the resin-coated cyan pigment dispersion (the colored particles) having 10.2% by mass of the pigment concentration was obtained.

—Resin-Coated Magenta Pigment Dispersion—

In the preparation of the resin-coated cyan pigment dispersion described above, the resin-coated magenta pigment dispersion (the colored particles) was obtained in the same way described above except using Chromophthal Jet Magenta DMQ (Pigment Red 122, manufactured by BASF Japan Ltd.) instead of Phthalocyanine blue A220 which was used as a pigment.

—Resin-Coated Yellow Pigment Dispersion—

In the preparation of the resin-coated cyan pigment dispersion described above, the resin-coated yellow pigment dispersion (the colored particles) was obtained in the same way described above except using Irgalite Yellow GS (Pigment yellow 74, manufactured by BASF Japan Ltd.) instead of Phthalocyanine blue A220 which was used as a pigment.

(Synthesis of Polyfunctional Polymerizable Compound)
—Synthesis of Polymerizable Compound 1—

According to the following scheme, the exemplified polymerizable compound 1 (the polyfunctional polymerizable compound 1) as above was synthesized.

(First Step)

121 g (1 equivalent) of tris(hydroxymethyl)aminomethane (manufactured by Tokyo Chemical Industry Co., Ltd.), 84 ml of 50% potassium hydroxide aqueous solution and 423 ml of toluene were added into a three-necked flask with a volume of 1 L, provided with a stirrer bar and stirred, while maintaining the reaction system at 20° C. to 25° C. in a water bath, 397.5 g (7.5 equivalent) of acrylonitrile was added dropwise over 2 hours thereto. After the dropwise addition, the mixture was stirred for 1.5 hours, then 540 ml of toluene was added into the reaction system, the reaction mixture was transferred to a separatory funnel, and the water phase was removed. After drying the remaining the organic phase using magnesium sulphate, the Celite filtration was conducted, and an acrylonitrile adduct was obtained by distilling off the solvent under reduced pressure. Since the results of analysis of the obtained substance by $^1$H-NMR and MS showed a good agreement with known products, the obtained substance was used in the next reduction reaction without further purification.

(Second Step)

24 g of the acrylonitrile adduct obtained before, 48 g of the Ni catalyst (Raney nickel 2400, manufactured by W. R. Grace & Co.), and 600 ml of 25% aqueous ammonia:methanol=1:1 solution were added into an autoclave with a volume of 1 L and were suspended, and the reaction vessel was sealed. Hydrogen of 10 MPa was introduced into the reaction vessel, and the reaction was conducted for 16 hours with a reaction temperature of 25° C.

The disappearance of the raw material was confirmed by $^1$H-NMR, the reaction mixture was filtrated by the Celite filtration, and the Celite was washed several times using methanol. By distilling off the solvent from the filtrate under reduced pressure, a polyamine body was obtained. The obtained substance was used in the next reaction without further purification.

(Third Step)

30 g of the polyamine body obtained before, 120 g (14 equivalent) of NaHCO$_3$, 1 L of dichloromethane, and 50 ml of water were added into a three-necked flask with a volume of 2 L, provided with a stirrer, 92.8 g (10 equivalent) of acrylic acid chloride was added dropwise over 3 hours thereto in an ice bath, and thereafter, stirring, was performed at room temperature for 3 hours. After the disappearance of the raw material was confirmed by $^1$H-NMR, the solvent was distilled from the reaction mixture under reduced pressure, the reaction mixture was dried using, magnesium sulphate, the Celite filtration was performed, and the solvent was distilled under reduced pressure. Finally, a white solid (yield of 40%) at normal temperature was obtained by purifying by using column chromatography (ethyl acetate/methanol=4:1). The yield of the three steps describe above was 40%.

[Chem. 11]

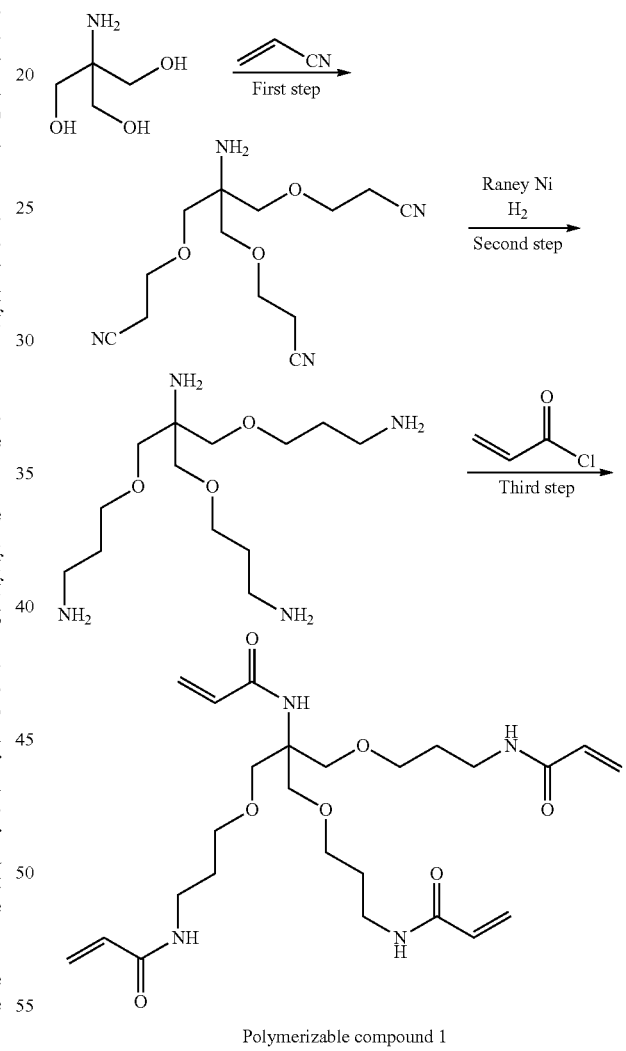

Polymerizable compound 1

The obtained white solid was identified by $^1$H-NMR under measurement conditions described below. The identification data is shown in FIG. 1.

$^1$H-NMR solvent: Deuterated Chloroform, Internal standard: TMS

From the data of $^1$H-NMR shown in FIG. 1, since the integrated ratio of the peak of one hydrogen which was derived from acrylic group near 5.6 ppm was 4 with respect to 6 of the integrated ratio of singlet peak (peak derived from the mother skeleton) near 3.75 ppm, it was found that the compound had four acrylic amide groups. From these results, it was confirmed that the white solid had a structure shown by the polymerizable compound 1.

—Synthesis of Polymerizable Compound 2—

In the first step of the synthesis scheme of the polymerizable compound 1, the polymerizable compound 2 (the polyfunctional polymerizable compound 2) (colorless liquid) was synthesized in the same way as the synthesis example of the polymerizable compound 1 except adding 74.7 g of methacrylonitrile instead of acrylonitrile. The yield of the three steps was 37%.

Moreover, by identifying by $^1$H-NMR in the same way as the synthesis example of the polymerizable compound 1, it was confirmed that the colorless liquid which was obtained by synthesizing had a structure shown by the polymerizable compound 2.

[Chem. 12]

Polymerizable compound 2

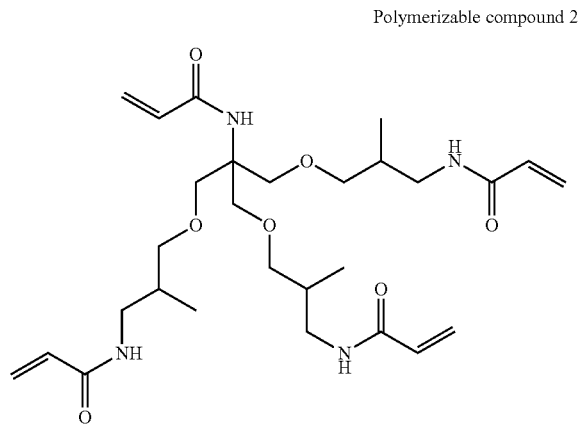

—Synthesis of Polymerizable Compound 3—

According to the following scheme, the polymerizable compound 3 (the polyfunctional polymerizable compound 3) was synthesized.

(First Step)

6.1 g of ethanolamine, 37.62 g of triethylamine, and 500 ml of tetrahydrofuran were added into a three-necked flask with a volume of 1 L and stirred in an ice bath. Secondly, 37.62 g of benzyl bromide was added dropwise by using a dropping funnel while maintaining the inner temperature at 10° C. or lower. After the dropwise addition, an ice bath was removed and stirring was performed at room temperature for 3 hours. The completion of the reaction was confirmed by TLC (Thin-Layer Chromatography), a saturated ammonium chloride aqueous solution was added to neutralize, and the reaction liquid was transferred to a separatory funnel. After the water phase and the organic phase were separated, the reaction product was extracted from the separated water phase three times with ethyl acetate, and the obtained organic phase was sufficiently dried by adding magnesium sulphate, the Celite filtration was conducted. The filtrate was concentrated under reduced pressure, purification was performed by column chromatography, and 22.89 g of ethanolamine in which nitrogen was protected with benzyl (a nitrogen protected ethanolamine) was obtained (yield of 95%).

(Second Step)

12 g of the nitrogen protected ethanolamine obtained before, 7.54 g of triethylamine, and 500 ml of tetrahydrofuran were added into a three-necked flask with a volume of 1 L and stirred in an ice bath. Secondly, 6.83 g of methanesulfonyl chloride was added dropwise by using a dropping funnel while maintaining the inner temperature at 10° C. or lower. After the dropwise addition, the ice bath was removed and stirring was performed at room temperature for 2 hours. The completion of the reaction was confirmed by TLC, a saturated ammonium chloride aqueous solution was added to neutralize, and the reaction liquid was transferred to a separatory funnel. After the water phase and the organic phase were separated, the reaction product was extracted from the separated water phase three times with ethyl acetate, and the obtained organic phase was sufficiently dried by adding magnesium sulphate, the Celite filtration was conducted. The filtrate was concentrated under reduced pressure, purification was performed by column chromatography, and 13.48 g of ethanolamine in which nitrogen and alcohol were protected was obtained (yield of 85%).

(Third Step)

1.5 g of 2-(hydroxymethyl)-2-nitro-1,3-propanediol and 400 ml of DMF (N,N-dimethylformamide) were added into a three-necked flask with a volume of 1 L and stirred in an ice bath. Secondly, sodium hydride (60%) was carefully added while maintaining the inner temperature at 15° C. or lower. After the addition, stirring was performed for 1 hour at room temperature, stirring was performed in an ice bath again and the inner temperature was set to 5° C. Next, a solution in which 10.53 g of the nitrogen and alcohol protected ethanolamine was dissolved in 100 ml of DMF was added dropwise by using a dropping funnel while maintaining the inner temperature at 10° C. or lower. After the dropwise addition, the ice bath was removed and stirring was performed at room temperature for 16 hours. The completion of the reaction was confirmed by TLC, water was added to make extra base deactivate, and the reaction liquid was transferred to a separatory funnel. After the water phase and the organic phase were separated, the reaction product was extracted from the separated water phase three times with ethyl acetate, and the obtained organic phase was sufficiently dried by adding magnesium sulphate, the Celite filtration was conducted. The filtrate was concentrated under reduced pressure, purification was performed by column chromatography, and 4.9 g of an aminoalcohol addition compound was obtained (yield of 60%).

(Fourth Step)

20.0 g of the aminoalcohol addition compound, 5.74 g of the 10 wt % Pd/C catalyst (manufactured by Aldrich) and 600 ml of methanol were added into an autoclave with a volume of 1 L and stirred. After the inside of an autoclave was replaced with nitrogen, hydrogen of 10 Mpa was introduced, and the reaction was conducted for 16 hours at 25° C. The obtained reaction liquid was filtrated by the Celite filtration, and the Ni catalyst was removed. By concentrating the filtrate under reduced pressure, 2.52 g of a polyamine compound was obtained (yield of 100%). The obtained polyamine body was used in the next reaction particularly without purification.

(Fifth Step)

2.52 g of the polyamine body obtained before, 6.72 g of sodium hydrogen carbonate, 500 mL of tetrahydrofuran, and 50 ml of water were added into a three-necked flask with a volume of 1 L and stirred in an ice bath. Next, 5.43 g of acrylic acid chloride was added dropwise while maintaining the temperature inside the flask at 10° C. or lower. After the dropwise addition, stirring was performed at room temperature for 2 hours. After the solid component of the obtained reaction mixture was filtrated by the Celite filtration and the filtrate was concentrated under reduced pressure, 2.46 g of a colorless liquid (yield of 53%) was obtained by purifying by using silica gel column chromatography (ethyl acetate/methanol=85:15). The yield of the five steps describe above was 26%.

Moreover, by identifying by $^1$H-NMR in the same way as the synthesis example of the polymerizable compound 1, it was confirmed that the colorless liquid which was obtained by synthesis had a structure shown by the polymerizable compound 3.

[Chem. 13]

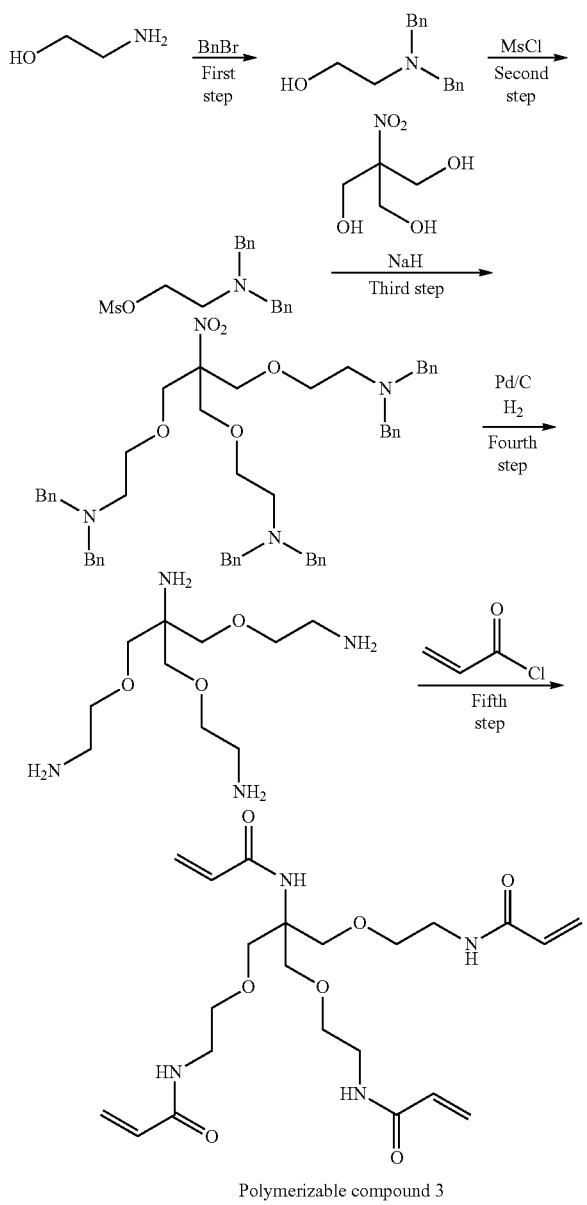

Polymerizable compound 3

—Synthesis of Polymerizable Compound 4—

In the first step of the synthesis scheme of the polymerizable compound 3, the polymerizable compound 4 (the polyfunctional polymerizable compound 4) (colorless liquid) was synthesized in the same way as the synthesis example of the polymerizable compound 3 except adding 6.1 g of 4-butanolamine instead of ethanolamine. The yield of the three steps was 23%.

Moreover, by identifying by $^1$H-NMR in the same way as the synthesis example of the polymerizable compound 1, it was confirmed that the colorless liquid which was obtained by synthesizing had a structure shown by the polymerizable compound 4.

[Chem. 14]

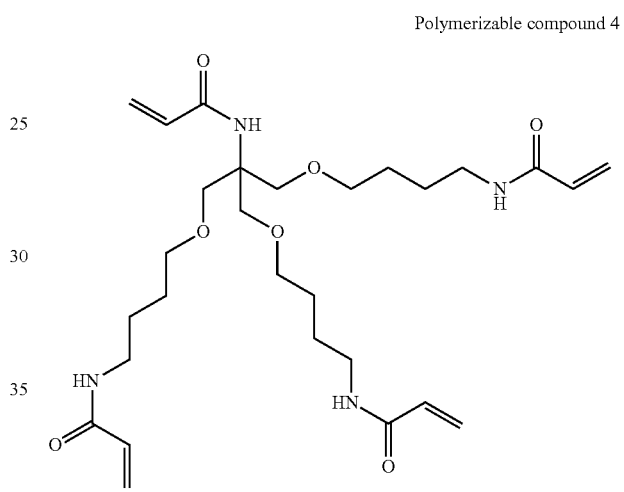

Polymerizable compound 4

—Synthesis of Polymerizable Compound for Comparison 1—

The polymerizable compound for comparison 1 (the comparative polymerizable compound 1) having the following structure was synthesized by combining well-known synthetic methods, in reference to JP2005-307198A.

[Chem. 15]

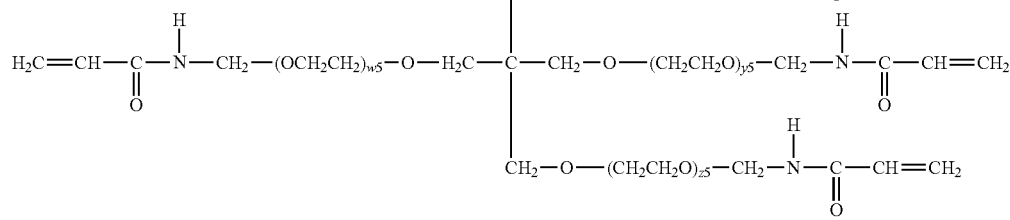

Polymerizable compound for comparison 1

$w5 + x5 + y5 + z5 = 6$

—Synthesis of Polymerizable Compound for Comparison 2—

The polymerizable compound for comparison 2 (the comparative polymerizable compound 2) having the following structure was synthesized by combining well-known synthetic methods, in reference to JP2005-307198A.

[Chem. 16]

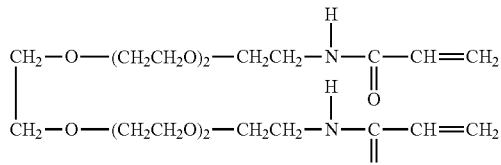

Polymerizable compound for comparison 2

Example 1

Preparation of Clear Ink Composition (Cl-1)

After the polyfunctional polymerizable compound which was synthesized as above, the polymerization initiator, the surfactant and ion-exchanged water were mixed, so as to become the following formulation, a clear ink (Cl-1) was prepared by filtering using a membrane filter of 5 μm.

—Ink Formulation—

| | |
|---|---|
| (Component A) Polyfunctional polymerizable compound 1 | 20% |
| (Component B) Irgacure 2959 (manufactured by BASF Japan Ltd.) | 3% |
| (Component E) Ion-exchanged water | add so that total is 100% |
| OLFINE E1010 (manufactured by Nissin Chemical Co., Ltd.) | 1% |

When the pH (25° C.) of the clear ink (Cl-1) was measured using a pH meter WM-50EG (manufactured by DKK-TOA CORPORATION), the pH value was 7.0.

Examples 2 to 4

Preparation of Clear Ink Compositions (Cl-2) to (Cl-4)

In Example 1, the clear ink compositions (Cl-2) to (Cl-4) were prepared in the same way as Example 1 except changing the kinds of the polyfunctional polymerizable compound of (Component A) as described in Table 1. All pH values were 7.0.

Moreover, the contents of the component (A) and the component (C) described in Table 1 are respectively the contents (% by mass) in the ink composition.

Examples 5

Preparation of Cyan Ink Composition (C-1)

After the polyfunctional polymerizable compound which was synthesized as above, the polymerization initiator, the resin-coated cyan pigment dispersion which was prepared as above, the surfactant and ion-exchanged water were mixed, so as to become the following formulation, a cyan ink (C-1) was prepared by filtering using a membrane filter of 5 μm.

—Ink Formulation—

| | |
|---|---|
| (Component A) Polyfunctional polymerizable compound 1 | 20% |
| (Component B) Irgacure 2959 (manufactured by BASF Japan Ltd.) | 3% |
| (Component E) Ion-exchanged water | add so that total is 100% |
| (Component D) Resin-coated cyan pigment dispersion | 6% |
| OLFINE E1010 (manufactured by Nissin Chemical Co., Ltd.) | 1% |

When the pH (25° C.) of the cyan ink (C-1) was measured using a pH meter WM-50EG (manufactured by DKK-TOA CORPORATION), the pH value was 8.5.

Example 6

Preparation of Yellow Ink Composition (Y-1)

In preparation of the cyan ink (C-1) of Example 5 described above, a yellow ink (Y-1) was prepared in the same way described above except using the resin-coated yellow pigment dispersion instead of the resin-coated cyan pigment dispersion. The pH value was 8.5.

Example 7

Preparation of Magenta Ink Composition (M-1)

In preparation of the cyan ink (C-1) of Example 5 described above, a magenta ink (M-1) was prepared in the same way described above except using the resin-coated magenta pigment dispersion instead of the resin-coated cyan pigment dispersion. The pH value was 8.5.

Example 8

Preparation of Black Ink Composition (K-1)

In preparation of the cyan ink (C-1) of Example 5 described above, a black ink (K-1) was prepared in the same way described above except using carbon black of the pigment dispersion (MA-100 manufactured by Mitsubishi Chemical Corporation) instead of the resin-coated cyan pigment dispersion. The pH value was 8.5.

Examples 9 to 18

Preparation of Ink Compositions (M-2) to (M-11)

In the ink composition of Example 7, the ink compositions (M-2) to (M-11) were prepared in the same way as Example 7 except adding the monofunctional polymerizable compound of the component (C) as described in Table 1 and changing the contents of the component (A) and the component (C) as described in Table 1. All pH values were 8.5.

Comparative Examples 1 to 2

Preparation of Ink Compositions for Comparison (RC-1) and (RC-2)

In Example 7, the ink compositions for comparison (RC-1) and (RC-2) were prepared in the same way as Example 7 except changing the polyfunctional polymerizable compound 1 of the component (A) to the polymerizable compound for comparison 1 or the polymerizable compound for comparison 2 which were prepared as above.

Comparative Examples 3 and 4

Preparation of Ink Compositions for Comparison (RC-3) and (RC-4)

In Example 12, the ink compositions for comparison (RC-3) and (RC-4) were prepared in the same way as Example 12 except changing the polyfunctional polymerizable compound of the component (A) to the polymerizable compound for comparison 1 or the polymerizable compound for comparison 2 which were prepared as above.

(Production of Processing Liquid)

The components shown in "Composition of processing liquid 1" described below were mixed to prepare the processing liquid 1. When the pH (25° C.) of the processing liquid 1 was measured using a pH meter (WM-50EG manufactured by DKK-TOA CORPORATION), the pH value was 1.02.

"Composition of Processing Liquid 1"

| | |
|---|---|
| Malonic acid (manufactured by Wako Pure Chemical Industries, Ltd.) | 25% |
| Diethylene glycol monomethyl ether (manufactured by Wako Pure Chemical Industries, Ltd.) | 20% |
| EMULGEN P109 (manufactured by Kao Corporation, nonionic surfactant) | 1% |
| Ion-exchanged water | residual so that total is 100% |

[Evaluation]

As to the ink compositions which were obtained as above, the evaluation of storage stability, curing properties, ejection recovery property of the ink compositions and flexibility of the formed image was conducted as below. The results are shown in Table 1.

[Evaluation of Storage Stability of Ink]

After the ink compositions which were obtained as above were put into a sample bottle and sealed, the ink compositions were stored over time for two weeks in a thermostatic chamber of 60° C. After two weeks, the ink compositions were taken out from the thermostatic chamber, the content of acrylamide in the ink compositions was determined quantitatively by high-performance liquid chromatography (HPLC).

—Evaluation Standard—

A: The content of acrylamide was the detection threshold or less (less than 10 ppm)

B: The content of acrylamide was 10 ppm or more and less than 500 ppm.

C: The content of acrylamide was 500 ppm or more.

(Image Formation)

As shown in FIG. 2, an ink jet device in which a processing liquid adding unit 12 provided with a processing liquid ejection head 12S, a processing liquid drying zone 13, an ink ejection unit 14, an ink drying zone 15 and an ultraviolet ray irradiation zone 16 provided with an ultraviolet ray irradiation lamp 16S were sequentially arranged toward the transport direction (in the direction of the arrow in Figure) of the recording medium was prepared.

The processing liquid drying zone 13 is provided with an air blower performing drying by blowing drying air on the recording surface side of the recording medium, provided with an infrared heater on the non-recording surface side of the recording medium, and is configured to evaporate (dry) 70% by mass or more of the water in the processing liquid by adjusting the temperature and the air amount until 900 msec has passed since the starting of the adding of the processing liquid by the processing liquid adding unit 12 (not shown).

In the ink ejection unit 14, a black ink ejection head 30K, a cyan ink ejection head 30C, a magenta ink ejection head 30M, and a yellow ink ejection head 30Y are arranged in order along the transport direction (the direction of the arrow), each head is a full line head having 1200 dpi/10 inch width (drive frequency: 25 kHz, transport speed of the recording medium 530 mm/sec) and the ink ejection unit 14 is configured to eject each color in the main scanning direction (the direction perpendicular to the transport direction of the recording medium) with a single pass and to perform recording.

The processing liquid 1 was filled into a storage tank (not shown) linked to the processing liquid ejection head 12S of the ink jet recording device described above. In addition, the ink compositions of corresponding colors were filled into any of the storage tanks (not shown) respectively linked to the ink ejection heads 30K, 30C, 30M, and 30Y. "OK Top Coat+" (Basis weight 104.7 g/m$^2$) manufactured by Oji Paper Co., Ltd. was used as a recording medium.

During recording of the image, the processing liquid and the ink compositions were ejected with a resolution of 1200 dpi×600 dpi with ink droplets of 3.5 pl and a line image or a solid image were recorded. At this time, the line image was recorded by of ejecting width 1 dot line, width 2 dot line, and width 4 dot line of 1200 dpi in the main scanning direction with a single pass. As to the solid image, an image with 104 mm×140 mm size, with respect to the recording medium which was cut to A5 size was recorded by ejecting the processing liquid and the ink composition. The addition amount of the processing liquid onto the recording medium was set to be 5 ml/m$^2$.

First, in the recording of an image, after the processing liquid was ejected from the processing liquid ejection head 12S onto the recording medium with a single pass, drying the processing liquid was performed in the processing liquid drying zone 13, and the recording medium was set to pass through the processing liquid drying zone 13 before 900 msec had passed from the ejection start of the processing liquid. In the processing liquid drying zone 13, while heating the processing liquid which was landed so that the temperature of the film surface became 40° C. to 45° C. with an infrared heater from the reverse side (rear side) of landing surface, warm air of 120° C. was sent to the recording surface by an air blower, and the air amount was changed so as to adjust to a predetermined drying amount. Subsequently, after the ink compositions was ejected with a single pass by any of the ink ejection heads 30K, 30C, 30M, and 30Y to record an image, in the ink drying zone 15, while heating with an infrared heater from the reverse side (rear side) of the ink landing surface, warm air of 120° C. and 5 m/sec was sent by an air blower to the recording surface for 15 seconds to dry in the same way described above. After drying the image, in the ultraviolet ray irradiation zone 16, UV light (metal halide lamp manufactured by Eye Graphics Co., Ltd., maximum irradiation wavelength 365 nm) was irradiated so that the total irradiation amount became 600 mJ/cm$^2$ to cure the image and a sample for evaluation was obtained.

[Evaluation of Curing Properties]

Tokubishi Art double-side N (manufactured by Mitsubishi Paper Mills Ltd.) was winded around a paperweight (weigh 470 g, size 15 mm×30 mm×120 mm) which was not printed (the area in which Tokubishi Art which was not printed comes into contact with a sample for evaluation is 150 mm$^2$), and the print surface of the sample for evaluation described above was rubbed back and forth three times (equivalent to the load 260 kg/m$^2$). After rubbing, the print surface was visually observed and evaluated according to the following evaluation standard.

—Evaluation Standard—

A: There was no peeling of an image (coloring material) on the print surface.

B: Peeling of an image (coloring material) on the print surface was slightly recognized.

C: Peeling of an image (coloring material) on the print surface was occurred at a practically problematic level.

[Evaluation of Ejection Recovery Properties]

An image was formed in the same way as the image forming method which was conducted at the evaluation of the curing properties described above. After an ink was ejected, an ink ejection head was left as it was for 5 minutes to 45 minute at every 5 minutes, a new recording medium was stuck on a stage and a line was printed by droplet shooting under the same conditions again. The exposure time in which all of the 96 nozzles were capable of ejecting with 2,000 of droplet shooting was examined and ejection recovery properties were evaluated according to the following evaluation standard. The longer the exposure time is, the more favourable ejection recovery properties are.

—Evaluation Standard—

A: After leaving as it is for 45 minutes, all nozzles are capable of ejecting.

B: By leaving as it is for 30 minutes or longer and shorter than 45 minutes, there are some nozzles which are not capable of ejecting.

C: By leaving as it is for 20 minutes or longer and shorter than 30 minutes, there are some nozzles which are not capable of ejecting.

D: By leaving as it is for shorter than 20 minutes, there are some nozzles which are not capable of ejecting.

[Evaluation of Flexibility]

A printer head of GELJET GX5000 manufactured by Ricoh Compony, Ltd. was prepared, the direction of a line head (the main scanning direction) on which 96 nozzles were lined up was matched with the direction perpendicular to the direction of movement of the stage (the sub-scanning direction), and the printer head was fixed to an ink jet device. The ink compositions which were prepared in Examples 1 to 18 or Comparative Examples 1 to 4 described above were filled in the storage tank which was linked to the printer head.

A vinyl chloride film (P280RW, manufactured by Lintec Corporation) was prepared as a recording medium and stuck on the stage which moved in the direction (the sub-scanning direction) perpendicular with respect to the array direction of nozzle of the head (the main scanning direction).

During making the stage move at 211 mm/sec in the transport direction (the sub-scanning direction), 96 lines were printed in parallel with respect to the transport direction by 2,000 of droplet shooting per one nozzle with the amount of ink droplets of 3.4 pL, the ejection frequency of 10 kHz and the array direction of nozzle×the transport direction=75 dpi× 1,200 dpi. At this time, it was confirmed that all nozzles ejected.

After printing, by espousing so as to be 600 mJ/cm$^2$ using a Deep UV lamp (manufactured by USHIO INC., SP-7), the sample for evaluation in which the solid image was formed was manufactured.

The sample for evaluation was folded once so that the print surfaces of the sample for evaluation on which the obtained solid image as above was formed were superimposed on each other, was further folded once in the direction of which the back surfaces were superimposed on each other, was visually observed and evaluated by the following evaluation standard.

—Evaluation Standard—

A: There was no crack and peeling.

B: The crack slightly occurred, but there was no peeling.

C: The crack and peeling occurred.

TABLE 1

| | Ink composition | Component (A) Compound | Content | Component (C) Compound | Content | Component (A):Component (C) | Storage stability | Curing properties | Ejection recovery property | Flexibility |
|---|---|---|---|---|---|---|---|---|---|---|
| Example 1 | Cl-1 | Polyfunctional polymerizable compound 1 | 20 | None | 0 | 20:0 | A | A | B | B |
| Example 2 | Cl-2 | Polyfunctional polymerizable compound 2 | 20 | None | 0 | 20:0 | A | A | B | B |
| Example 3 | Cl-3 | Polyfunctional polymerizable compound 3 | 20 | None | 0 | 20:0 | A | A | B | B |
| Example 4 | Cl-4 | Polyfunctional polymerizable compound 4 | 20 | None | 0 | 20:0 | A | A | B | B |
| Example 5 | C-1 | Polyfunctional polymerizable compound 1 | 20 | None | 0 | 20:0 | A | A | B | B |
| Example 6 | Y-1 | Polyfunctional polymerizable compound 1 | 20 | None | 0 | 20:0 | A | A | B | B |
| Example 7 | M-1 | Polyfunctional polymerizable compound 1 | 20 | None | 0 | 20:0 | A | A | B | B |
| Example 8 | K-1 | Polyfunctional polymerizable compound 1 | 20 | None | 0 | 20:0 | A | A | B | B |
| Example 9 | M-2 | Polyfunctional polymerizable compound 1 | 15 | Hydroxyethyl acrylamide | 5 | 15:5 | A | A | B | B |

TABLE 1-continued

| Ink composition | | Component (A) | | Component (C) | | Component (A):Component (C) | Storage stability | Curing properties | Ejection recovery property | Flexibility |
|---|---|---|---|---|---|---|---|---|---|---|
| | | Compound | Content | Compound | Content | | | | | |
| Example 10 | M-3 | Polyfunctional polymerizable compound 1 | 15 | Dimethylacrylamide | 5 | 15:5 | A | A | B | B |
| Example 11 | M-4 | Polyfunctional polymerizable compound 1 | 15 | Diacetone acrylamide | 5 | 15:5 | A | A | B | B |
| Example 12 | M-5 | Polyfunctional polymerizable compound 1 | 15 | Acryloyl morpholine | 5 | 15:5 | A | A | B | B |
| Example 13 | M-6 | Polyfunctional polymerizable compound 1 | 10 | Hydroxyethyl acrylamide | 10 | 10:10 | A | A | A | A |
| Example 14 | M-7 | Polyfunctional polymerizable compound 1 | 10 | Dimethylacrylamide | 10 | 10:10 | A | B | A | A |
| Example 15 | M-8 | Polyfunctional polymerizable compound 1 | 10 | Diacetone acrylamide | 10 | 10:10 | A | B | A | A |
| Example 16 | M-9 | Polyfunctional polymerizable compound 1 | 5 | Hydroxyethyl acrylamide | 15 | 5:15 | A | A | A | A |
| Example 17 | M-10 | Polyfunctional polymerizable compound 1 | 5 | Dimethylacrylamide | 15 | 5:15 | A | B | A | A |
| Example 18 | M-11 | Polyfunctional polymerizable compound 1 | 5 | Diacetone acrylamide | 15 | 5:15 | A | B | A | A |
| Comparative Example 1 | RC-1 | Comparative polymerizable compound 1 | 20 | None | 0 | 20:0 | C | A | B | B |
| Comparative Example 2 | RC-2 | Comparative polymerizable compound 2 | 20 | None | 0 | 20:0 | A | C | B | B |
| Comparative Example 3 | RC-3 | Comparative polymerizable compound 1 | 15 | Acryloyl morpholine | 5 | 15:5 | C | A | B | B |
| Comparative Example 4 | RC-4 | Comparative polymerizable compound 2 | 15 | Acryloyl morpholine | 5 | 15:5 | A | C | B | A |

As it is clear from the results in Table 1, the ink compositions of Examples 1 to 18 include the polyfunctional polymerizable compounds 1 to 4 represented by the general formula (1), and in all evaluation items of storage stability, curing properties, ejection recovery property and flexibility, excellent results were shown. Particularly, in the ink compositions of Examples 13 to 18 which include a certain amount of the monofunctional polymerizable compound, in addition to the polyfunctional polymerizable compound, ejection recovery property and flexibility were further enhanced.

In contrast, in the ink compositions of Comparative Examples 1 to 4 which do not include the polyfunctional polymerizable compound represented by the general formula (1), the desired storage stability or curing properties were not obtained.

The present application is a continuation application of International Application No. PCT/JP2012/066388, filed Jun. 27, 2012, which claims priority to Japanese Patent Application No. 2011-152280, filed Jul. 8, 2011. The contents of these applications are incorporated herein by reference in their entirety.

What is claimed is:

1. An ink composition comprising:
(A) a polymerizable compound represented by the following general formula (1); and
(B) a polymerization initiator,

[Chem. 1]

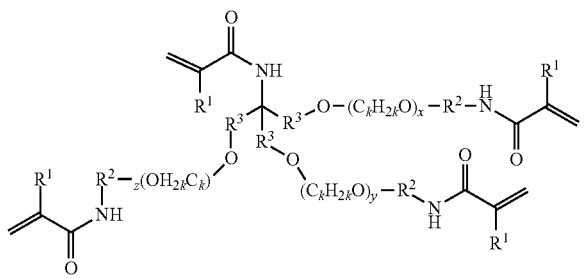

General formula (1)

in the general formula (1),
$R^1$ represents a hydrogen atom or a methyl group,
$R^2$ represents a liner or branched alkylene group having 2 to 4 carbon atoms,
however, in $R^2$, it is not possible to have a structure in which an oxygen atom and a nitrogen atom which are bonded to both ends of $R^2$ are bonded to the same carbon atom of $R^2$,
$R^3$ represents a divalent linking group,
k represents 2 or 3, and, x, y and z each independently represent an integer of 0 to 6 and x+y+z satisfies 0 to 18.

2. The ink composition according to claim 1, further comprising:
(C) a monofunctional polymerizable compound.

3. The ink composition according to claim 2,
wherein (C) the monofunctional polymerizable compound is a monofunctional polymerizable compound having a (meth)acrylamide structure.

4. The ink composition according to claim 2,
wherein (C) the monofunctional polymerizable compound is, a compound represented by the following general formula (2),

[Chem. 2]

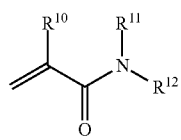

General formula (2)

in the general formula (2),
$R^{10}$ represents a hydrogen atom or a methyl group,
$R^{11}$ represents a hydrogen atom, a methyl group or an ethyl group,
$R^{12}$ represents a substituted or unsubstituted alkyl group,
$R^{11}$ and $R^{12}$ may be bonded to each other to form a five to eight-membered ring and the five to eight-membered ring may further include at least one kind selected from —O—, —S— and —$NR^b$—, and,
$R^b$ represents a hydrogen atom or an alkyl group having 1 to 4 carbon atoms.

5. The ink composition according to claim 2,
wherein the ratio of contents of (A) the polymerizable compound and (C) the monofunctional polymerizable compound in the ink composition is (A):(C)=1:99 to 90:10 in mass basis.

6. The ink composition according to claim 4,
wherein the content mass ratio of (A) the polymerizable compound and (C) the monofunctional polymerizable compound in the ink composition is (A):(C)=1:99 to 90:10.

7. The ink composition according to claim 1,
wherein the content of (A) the polymerizable compound to the total amount of the ink composition is from 0.1% by mass to 20% by mass.

8. The ink composition according to claim 4,
wherein the content of (A) the polymerizable compound to the total amount of the ink composition is from 0.1% by mass to 20% by mass.

9. The ink composition according to claim 6,
wherein the content of (A) the polymerizable compound to the total amount of the ink composition is from 0.1% by mass to 20% by mass.

10. The ink composition according to claim 2,
wherein the content of (C) the monofunctional polymerizable compound to the total amount of the ink composition is from 2% by mass to 35% by mass.

11. The ink composition according to claim 4,
wherein the content of (C) the monofunctional polymerizable compound to the total amount of the ink composition is from 2% by mass to 35% by mass.

12. The ink composition according to claim 6,
wherein the content of (C) the monofunctional polymerizable compound to the total amount of the ink composition is from 2% by mass to 35% by mass.

13. The ink composition according to claim 10,
wherein the content of (C) the monofunctional polymerizable compound to the total amount of the ink composition is from 2% by mass to 35% by mass.

14. The ink composition according to claim 1, further comprising:
(D) a coloring material.

15. The ink composition according to claim 1, further comprising:
(E) a solvent.

16. The ink composition according to claim 15,
wherein (E) the solvent comprises water.

17. The ink composition according to claim 1, which is for ink jet recording.

18. An image forming method comprising:
applying the ink composition according to claim 1 onto a recording medium; and
irradiating the applied ink composition with an active energy ray.

19. The image forming method according to claim 18,
wherein applying the ink composition onto the recording medium is performed by an ink jet method.

* * * * *